(12) United States Patent  
Miki et al.

(10) Patent No.: US 10,170,090 B2  
(45) Date of Patent: Jan. 1, 2019

(54) MUSIC INFORMATION GENERATING DEVICE, MUSIC INFORMATION GENERATING METHOD, AND RECORDING MEDIUM

(71) Applicants: Visionarist Co., Ltd, Nara (JP); Cloud10 Corporation, Kyoto (JP)

(72) Inventors: Manabu Miki, Nara (JP); Shinichi Miki, Nara (JP); Ikuo Minakata, Kyoto (JP); Satoshi Minakata, Kyoto (JP)

(73) Assignees: VISIONARIST CO., LTD, Nara (JP); CLOUD10 CORPORATION, Kyoto (JP)

( * ) Notice: Subject to any disclaimer, the term of this patent is extended or adjusted under 35 U.S.C. 154(b) by 0 days.

(21) Appl. No.: 15/612,417

(22) Filed: Jun. 2, 2017

(65) Prior Publication Data

US 2017/0358284 A1 Dec. 14, 2017

(30) Foreign Application Priority Data

Jun. 8, 2016 (JP) .................................. 2016-114123

(51) Int. Cl.  
*G11B 27/00* (2006.01)  
*H04N 5/93* (2006.01)  
(Continued)

(52) U.S. Cl.  
CPC .......... *G10H 1/0025* (2013.01); *G06K 9/4652* (2013.01); *G10H 1/38* (2013.01);  
(Continued)

(58) Field of Classification Search  
USPC .......... 386/285, 278, 282, 239, 248; 84/609, 84/610, 611, 612, 613; 704/270  
See application file for complete search history.

(56) References Cited

U.S. PATENT DOCUMENTS 6,542,869 B1 * 4/2003 Foote ................ G06F 17/30743  
704/200.1

FOREIGN PATENT DOCUMENTS

JP H07-073320 A 3/1995  
JP 2007-219393 A 8/2007

OTHER PUBLICATIONS

Japanese Office Action dated Sep. 6, 2016, for JP 2016-114123.  
(Continued)

*Primary Examiner* — Daquan Zhao  
(74) *Attorney, Agent, or Firm* — Bacon & Thomas, PLLC

(57) ABSTRACT

A music information generating device, including: a block color name recognizing part which selects and determines, from among plural color names which are made to correspond to plural ranges of color attribute value having been set beforehand, a color name corresponding to the representative-color of the block as a block color name of the block, by recognizing to which range of the color attribute value the representative-color of the block belongs, where the plural color names have been made or are going to be made to correspond to the plural sound-source names having been stored; and a diagram music-score generating unit which selects, based on a criterion having been set beforehand, a designated block from among the blocks having been arranged in lattice shape, and thereby generates a diagram music-score.

15 Claims, 12 Drawing Sheets

(51) Int. Cl.
*G10H 1/00* (2006.01)
*G06K 9/46* (2006.01)
*G11B 27/031* (2006.01)
*G10H 1/38* (2006.01)
*H04N 9/80* (2006.01)

(52) U.S. Cl.
CPC ...... *G11B 27/031* (2013.01); *G10H 2210/111* (2013.01); *G10H 2220/015* (2013.01); *G10H 2220/126* (2013.01); *G10H 2220/455* (2013.01)

(56) References Cited

OTHER PUBLICATIONS

Tsutomu Wakabayashi, Takahiro Kobayashi and Mami Hirabayashi: "Proposal of Melody Automatic Generating System Using Features of Picture-Image", IPSJ Interaction, 2011.
Masaya Fujita: "Investigation of Music-Composition Automatic Generating System by Picture-Image Information", Tokyo City University, 2012 Graduation Study Summary.
Kenji Kojima: "RGB MusicLab Converting Color Information of Picture-Image Into Music", V34 (2010), [online] Internet <http://www.forest.impress.co.jp/docs/review/20100421_362686.html>.

* cited by examiner

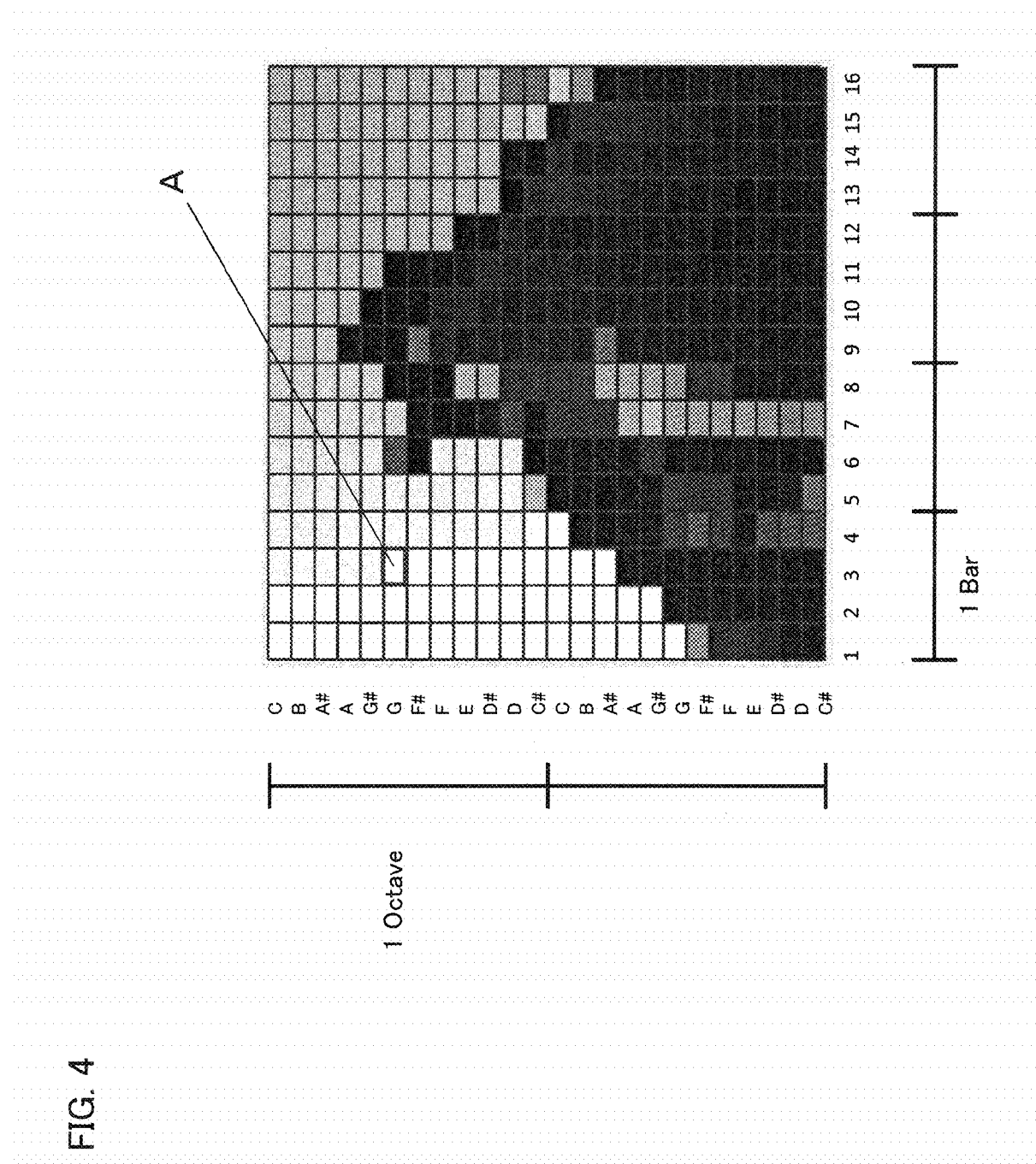

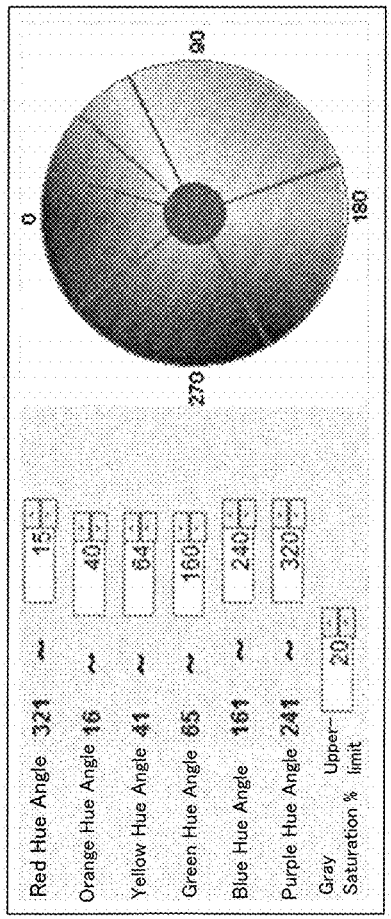
FIG. 5A
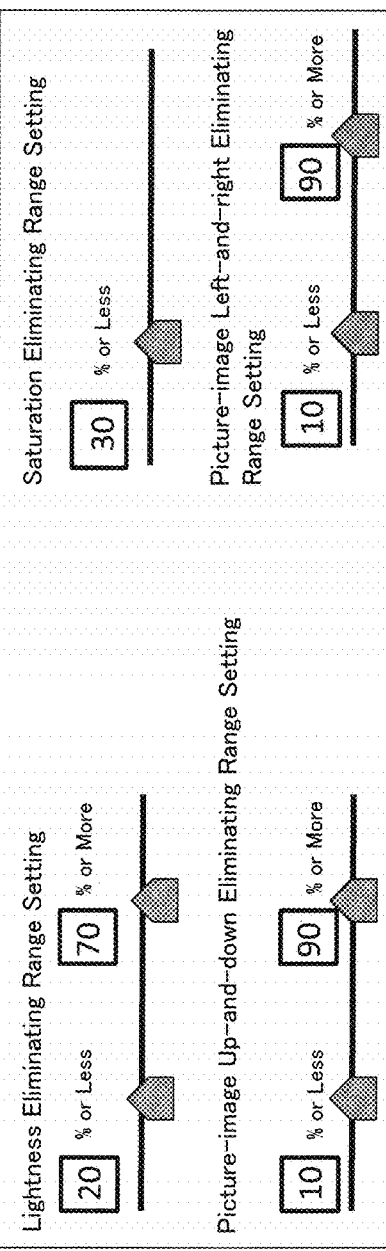
FIG. 5B
FIG. 5C

MUSIC INFORMATION GENERATING DEVICE, MUSIC INFORMATION GENERATING METHOD, AND RECORDING MEDIUM

BACKGROUND OF THE INVENTION

The present invention relates to a music information generating device, a music information generating method, and a recording medium, related to a generating/reproducing device of picture-image music which generates/reproduces music from a picture-image, a generating/reproducing method of picture-image music, and the like.

In recent years, methods are proposed which generate music from RGB values meaning physical levels of picture-element color included in a picture-image. For example, methods are proposed which create sorts of musical-notes by RGB values (for example, refer to Non-patent document D1), or create a major key or a minor key and harmony-tone from RGB values (for example, refer to Non-patent document D2) or alternatively, cause the RGB value to correspond to a pitch of sound, harmony-tone, or the sort of a music-instrument (for example, refer to Non-patent document D3).

D1: TSUTOMU WAKABAYASHI, TAKAHIRO KOBAYASHI and MAMI HIRABAYASHI: "PROPOSAL OF MELODY AUTOMATIC GENERATING SYSTEM USING FEATURES OF PICTURE-IMAGE" IPSJ Interaction 2011

D2: MASAYA FUJITA: "INVESTIGATION OF MUSIC-COMPOSITION AUTOMATIC GENERATING SYSTEM BY PICTURE-IMAGE INFORMATION" Tokyo City University 2012 Graduation Study Summary D3: KENJI KOJIMA: "'RGB MusicLab' CONVERTING COLOR INFORMATION OF PICTURE-IMAGE INTO MUSIC" V34 (2010) [online] Internet <URL: http://www.forest.impress.co.jp/docs/review/20100421_362686.html>

SUMMARY OF THE INVENTION

In general, music is played by a music-score which represents music elements configuring the music, namely, the pitches of sound (the sound-pitches), the lengths of sound (the note-values), the beat of sound (the rhythm), the key (a major key or a minor key), the harmony-tone, the music-instruments to use of plural sorts, and the like.

Yet, these proposals only make use of a part of these music elements, the music which is generated is excessively incomplete and, for example, music of organization such as an orchestra by plural music-instruments cannot be generated. Moreover, because a music-score cannot be generated, the music which has been generated has to be evaluated only with an auditory-sense. Accordingly, objective evaluation by a music-score cannot be carried out, and revision to the music which has been generated cannot be carried out.

It is desirable that the visual-sense characteristic of the music which is generated from a picture-image possess similarity and correlation, with the visual-sense characteristic of the picture-image.

But because the above described proposals are all conversions from an RGB value of the physical level with low correlation with the perception into each music element, the similarity at the perception level of a human is bad. Moreover, the purposes of these proposals are to generate music from only one picture-image, and music of one tune cannot be generated like a slideshow by causing plural picture-images to be consecutive. Moreover, music and a music-score cannot be automatically generated from a picture-image and thereby reproduced with simple manipulation.

However, it is desirable that music being more appropriate to a picture-image be automatically generated.

The present invention furnishes, in consideration of the above described conventional problem, a music information generating device, a music information generating method, and a recording medium, for which music being more appropriate to a picture-image can be automatically generated.

The $1^{st}$ aspect of the present invention is a music information generating device, comprising:

a picture-image inputting part which inputs a picture-image;

a sound-source name memorizing part which stores plural sound-source names;

a block representative-color determining part which determines, where with a vertical axis corresponding to a pitch of sound and a horizontal axis corresponding to a progression time of sound, the picture-image is divided into blocks having been arranged in lattice shape, a representative-color of each of the blocks;

a block color name recognizing part which selects and determines, from among plural color names which are made to correspond to plural ranges of color attribute value having been set beforehand, a color name corresponding to the representative-color of the block as a block color name of the block, by recognizing to which range of the color attribute value the representative-color of the block belongs, where the plural color names have been made or are going to be made to correspond to the plural sound-source names having been stored; and a diagram music-score generating unit which selects, based on a criterion having been set beforehand, a designated block from among the blocks having been arranged in lattice shape, and thereby generates a diagram music-score.

The $2^{nd}$ aspect of the present invention is the music information generating device according to the $1^{st}$ aspect of the present invention, comprising:

a picture-image memorizing part which stores the picture-image having been inputted from the picture-image inputting part;

a displaying part which displays at least the picture-image;

a sound-source name setting part which makes the plural color names, and the plural sound-source names correspond to each other; and a music data generating part which generates music data from the diagram music-score having been generated, wherein the displaying part displays at least one of a mosaic picture-image where the blocks having been arranged in lattice shape have been painted out with the representative-colors, and a mosaic picture-image where the designated block having been selected has been painted out with a color of the block color name.

The $3^{rd}$ aspect of the present invention is the music information generating device according to the $1^{st}$ aspect of the present invention, wherein the diagram music-score generating unit utilizes an eliminating parameter relating to at least one of color attribute of the block having been arranged in the lattice shape, and position attribute of the block in the picture-image, and thereby selects the designated block.

The $4^{th}$ aspect of the present invention is the music information generating device according to the $2^{nd}$ aspect of the present invention, comprising an audio-sound outputting part which reproduces the music data having been generated, wherein the displaying part displays, in such a manner that reproduction of the music data having been generated synchronizes with displaying, at least one of the picture-image having been stored and the diagram music-score having been generated.

The $5^{th}$ aspect of the present invention is the music information generating device according to the $2^{nd}$ aspect of the present invention, comprising:

an audio-sound outputting part which reproduces the music data having been generated; and a slideshow generating part which performs, in such a manner that reproduction of the music data having been generated from plural picture-images having been inputted to the picture-image inputting part synchronizes with displaying, a slideshow of the plural picture-images.

The $6^{th}$ aspect of the present invention is the music information generating device according to the $2^{nd}$ aspect of the present invention, comprising a moving-picture file creating part which integrates the music data having been generated from plural picture-images having been inputted to the picture-image inputting part, and data of the plural picture-images, and thereby creates a moving-picture file.

The $7^{th}$ aspect of the present invention is the music information generating device according to the $2^{nd}$ aspect of the present invention, wherein the music data generating part causes plural blocks, which have the same block color name consecutively in a direction of the horizontal axis, to correspond to one musical-note, and thereby generates the music data.

The $8^{th}$ aspect of the present invention is the music information generating device according to the $2^{nd}$ aspect of the present invention, wherein the displaying part displays a figure which is utilized for performing setting of the range of the color attribute value, setting of a parameter for selection of the designated block, and setting of the sound-source name.

The $9^{th}$ aspect of the present invention is the music information generating device according to the $1^{st}$ aspect of the present invention, wherein the diagram music-score generating unit utilizes harmony-tone correction for producing harmony-tone, and thereby generates the diagram music-score.

The $10^{th}$ aspect of the present invention is the music information generating device according to the $2^{nd}$ aspect of the present invention, wherein the music data having been generated, or the diagram music-score having been generated is sent to at least one of a designated terminal, and a designated server.

The $11^{th}$ aspect of the present invention is the music information generating device according to the $10^{th}$ aspect of the present invention, wherein the picture-image having been inputted to the picture-image inputting part is a picture-image having been sent from the designated terminal and received.

The $12^{th}$ aspect of the present invention is the music information generating device according to the $10^{th}$ aspect of the present invention, wherein the designated terminal is another terminal which is not a terminal having sent the picture-image having been inputted to the picture-image inputting part, and the music data having been generated, or the diagram music-score having been generated is sent to at least one of the another terminal, and the designated server, along with the picture-image having been inputted to the picture-image inputting part.

The $13^{th}$ aspect of the present invention is the music information generating device according to the $6^{th}$ aspect of the present invention, wherein the plural picture-images having been inputted to the picture-image inputting part are plural picture-images having been sent from a designated terminal and received, and the moving-picture file having been created is sent to at least one of the designated terminal, a terminal different to the designated terminal, and a designated server.

The $14^{th}$ aspect of the present invention is the music information generating device according to the $1^{st}$ aspect of the present invention, wherein the diagram music-score generating unit utilizes a sound-source name of the block, a pitch of sound of the block, and a progression time of sound of the block, and thereby generates the diagram music-score.

The $15^{th}$ aspect of the present invention is a music information generating method, comprising:

a picture-image inputting step which inputs a picture-image;

a sound-source name memorizing step which stores plural sound-source names;

a block representative-color determining step which determines, where with a vertical axis corresponding to a pitch of sound and a horizontal axis corresponding to a progression time of sound, the picture-image is divided into blocks having been arranged in lattice shape, a representative-color of each of the blocks;

a block color name recognizing step which selects and determines, from among plural color names which are made to correspond to plural ranges of color attribute value having been set beforehand, a color name corresponding to the representative-color of the block as a block color name of the block, by recognizing to which range of the color attribute value the representative-color of the block belongs, where the plural color names have been made or are going to be made to correspond to the plural sound-source names having been stored; and a diagram music-score generating step which selects, based on a criterion having been set beforehand, a designated block from among the blocks having been arranged in lattice shape, and thereby generates a diagram music-score.

The $16^{th}$ aspect of the present invention is a computer-readable recording medium, recording a program for causing a computer to function as the block representative-color determining step which determines, where with a vertical axis corresponding to a pitch of sound and a horizontal axis corresponding to a progression time of sound, the picture-image is divided into blocks having been arranged in lattice shape, a representative-color of each of the blocks, the block color name recognizing step which selects and determines, from among plural color names which are made to correspond to plural ranges of color attribute value having been set beforehand, a color name corresponding to the representative-color of the block as a block color name of the block, by recognizing to which range of the color attribute value the representative-color of the block belongs, where the plural color names have been made or are going to be made to correspond to the plural sound-source names having been stored, and the diagram music-score generating step which selects, based on a criterion having been set beforehand, a designated block from among the blocks having been arranged in lattice shape, and thereby generates a diagram music-score of the music information generating method according to the $15^{th}$ aspect of the present invention.

By the present invention, a music information generating device, a music information generating method, and a recording medium for which music being more appropriate to a picture-image is able to be automatically generated can be furnished.

BRIEF DESCRIPTION OF THE DRAWINGS

FIG. 4 is a description view of the representative-color mosaic picture-image of the embodiment in the present invention;

FIG. 5A is a description view of the sound-source color name range setting manipulation screen of the embodiment in the present invention, FIG. 5B is a description view of the sound-source setting manipulation screen of the embodiment in the present invention, and FIG. 5C is a description view of the picture-image music conversion adjustment setting manipulation screen of the embodiment in the present invention;

DESCRIPTION OF THE REFERENCE NUMERALS

| | |
|---|---|
| 1 | picture-image music generating device |
| 3 | picture-image inputting part |
| 15 | sound-source memorizing part |
| 19 | block representative-color determining part |
| 21 | block color name recognizing part |
| 25 | block selecting part |
| 27 | diagram music-score generating part |

DETAILED DESCRIPTION OF THE INVENTION

Figure 1:
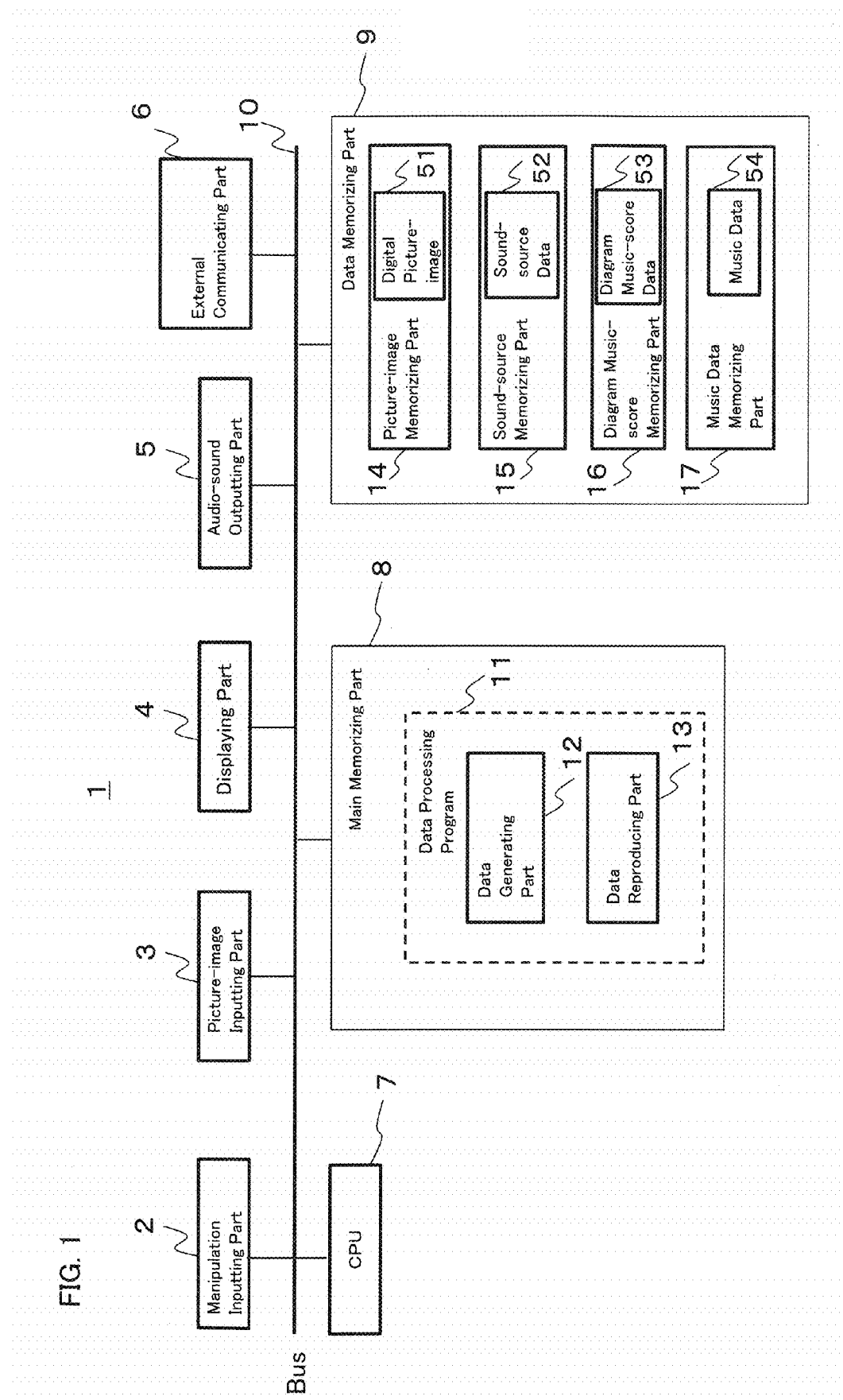
FIG. 1 is a configuration view of the picture-image music generating device of the embodiment in the present invention.

In the following, regarding a picture-image music generating device 1 pertaining to the first embodiment of the present invention, descriptions are given referring to the drawings. FIG. 1 shows the hardware configuration of the picture-image music generating device 1 pertaining to the present invention.

While descriptions are given regarding the operations of the picture-image music generating device 1 of the present embodiment, descriptions are given also regarding an embodiment of the music information generating method of the present invention.

Additionally, the picture-image music generating device 1 is an example of the music information generating device of the present invention.

Moreover, a means which includes a block selecting part 25 and a diagram music-score generating part 27 is an example of the diagram music-score generating unit of the present invention.

Moreover, a sound-source memorizing part 15 is an example of the sound-source name memorizing part of the present invention. Moreover, a sound-source setting part 26 is an example of the sound-source name setting part of the present invention.

Moreover, a smartphone 105, a PC 107, a digital camera 106, a digital photo frame 103, an Internet-compatible TV 104 are examples of the terminal of the present invention. Moreover, a picture-image music server 102 is an example of the server of the present invention.

The Basic Configuration and Operations of the Picture-image Music Generating Device 1.

Figure 2:
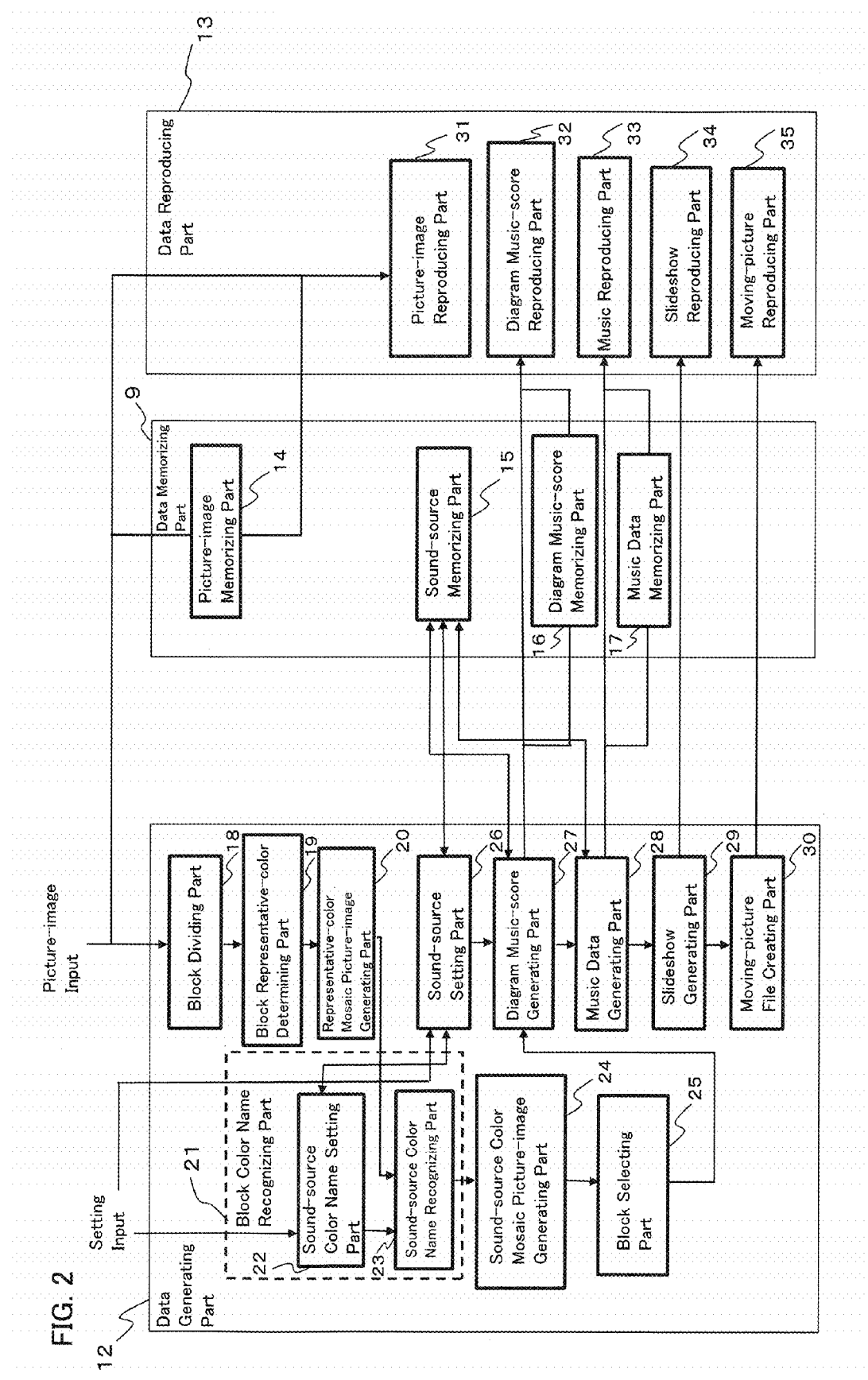
FIG. 2 is a description view of the picture-image music generating/reproducing correlation of the embodiment in the present invention.

While mainly referring to FIGS. 1 and 2, descriptions are performed. Here, FIG. 1 is a configuration view of the picture-image music generating device 1 of the embodiment in the present invention, and FIG. 2 is a description view of the picture-image music generating/reproducing correlation of the embodiment in the present invention.

The picture-image music generating device 1 includes a manipulation inputting part 2 to which a manipulation command is inputted, a picture-image inputting part 3 which includes a photographing element such as a camera and the like, a displaying part 4 which displays picture-images or letters or diagrams or the like, an audio-sound outputting part 5 which includes a speaker and outputs voice or music or the like, a wireless or wired external communicating part 6 for sending/receiving data with an external device, a CPU 7 (a controlling part) which controls the whole device, a main memorizing part 8 which memorizes a data processing program 11, and a data memorizing part 9, and these are connected with a bus 10. Here, in the data processing program 11, a data generating part 12 and a data reproducing part 13 are included and, in the data memorizing part 9, a picture-image memorizing part 14 which memorizes a digital picture-image 51, the sound-source memorizing part 15 which memorizes sound-source data 52, a diagram music-score memorizing part 16 which memorizes diagram music-score data 53, and a music data memorizing part 17 which memorizes music data 54 are included.

Additionally, the manipulation inputting part 2 is an arbitrary manipulation inputting part such as a keyboard, a touch inputting panel, an audio-sound inputting part, a remote-controller, or the like. Moreover, the picture-image inputting part 3 is an arbitrary device, which can obtain picture-images, such as an image picking-up device such as a camera, a scanner or the like or alternatively, a memory card, a USB memory, an HDD memory, an optical disk memory, or the like. In the present embodiment, the picture-image inputting part 3 is a camera having an image picking-up element, and the picture-image to input is the digital picture-image 51. Moreover, in a case where the configuration of the picture-image music generating device 1 is built in as a network server, the audio-sound outputting part 5 and the displaying part 4 are not necessarily necessitated but, in the present embodiment, for easily carrying out the descriptions, the picture-image music generating device 1 has the audio-sound outputting part 5 which includes a speaker, and the displaying part 4 which includes a displaying device. Moreover, the music data 54 have the information of the music elements which include the sound-pitches, the note-values, the strength, the tempo, the key, the harmony-tone, the sound-sources, and the like, relating to the sounds of the whole tune, and the information of the music-score.

Described in accordance with the description view of the picture-image music generating/reproducing correlation of FIG. 2 is the function for which, using a hardware configuration such as the picture-image music generating device 1 of FIG. 1, data processing of the digital picture-image 51 which is inputted from the picture-image inputting part 3 is carried out by the CPU 7, and the data processing program 11 which possesses a role of causing the CPU 7 to execute the function as the data generating part 12 and the function as the data reproducing part 13, and the music data 54 is generated and thereby outputted to the audio-sound outputting part 5.

The block dividing function, the determining function of the block representative-color, the generating function of the representative-color mosaic picture-image, as the functions of a representative-color mosaic picture-image generating part 20, are described in this order.

Additionally, a mosaic picture-image where the blocks having been arranged in lattice shape have been painted out with the representative-colors, and a mosaic picture-image where the designated block having been selected has been painted out with a color of the block color name may be displayed in the displaying part 4, or may not be displayed.

The Block Dividing Function.

Figure 3:
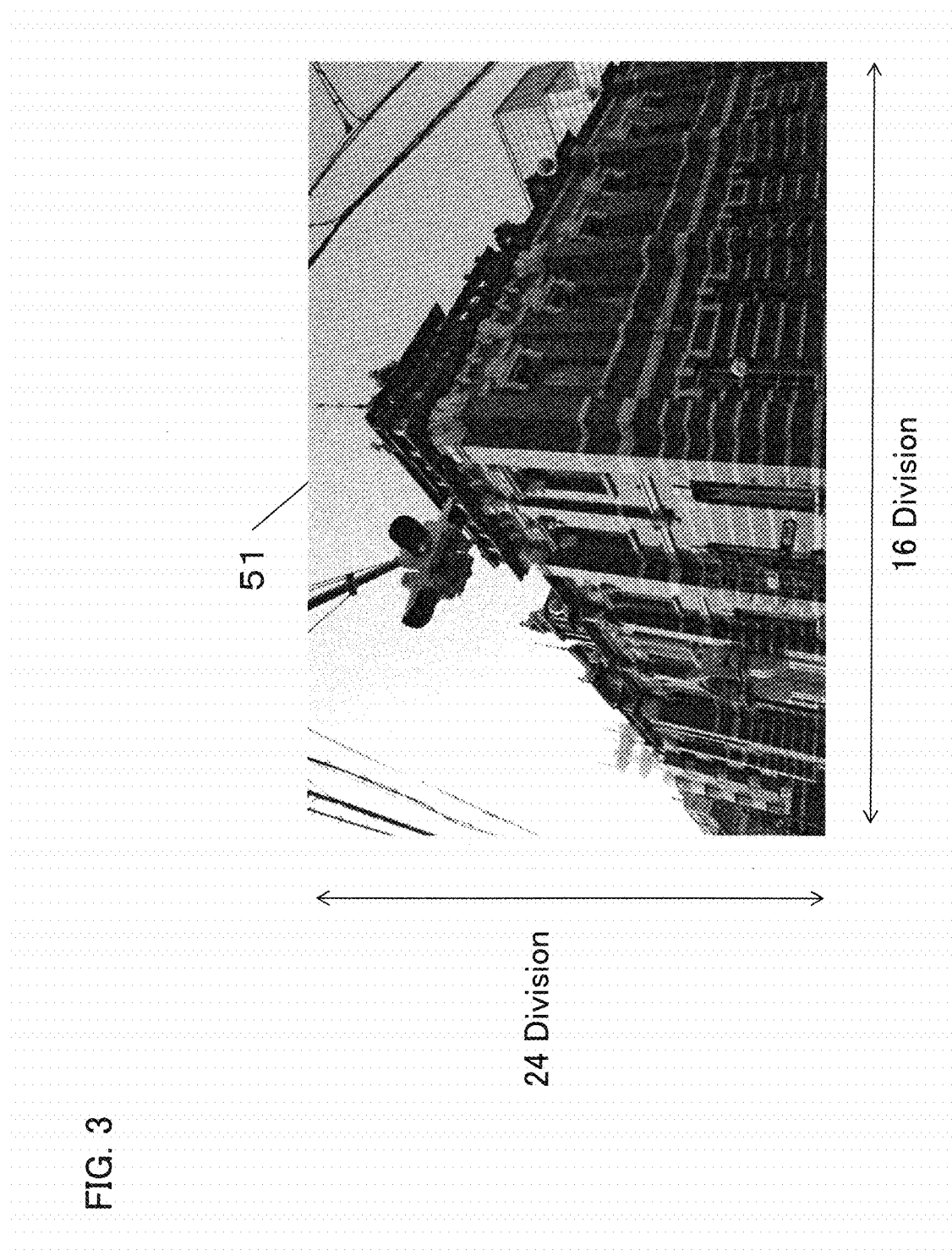
FIG. 3 is a description view of the digital picture-image of the embodiment in the present invention.

While mainly referring to FIGS. 3 and 4, descriptions are performed. Here, FIG. 3 is a description view of the digital picture-image of the embodiment in the present invention, and FIG. 4 is a description view of the representative-color mosaic picture-image of the embodiment in the present invention.

Descriptions are given regarding the function means, as a block dividing part 18, for which the digital picture-image 51 shown in FIG. 3 is, as shown in FIG. 4, vertically and horizontally partitioned in lattice shape and thereby is divided into blocks. In the present embodiment, the total length of the vertical axis is a length of integer-number octaves (specifically, 2 octaves), and the CPU 7 is, in accordance with the program of the block dividing part 18, caused to carry out execution, in such a manner that the 1 octave is, corresponding to the musical-interval of the measure of the 24 musical-scale having been expressed with the 12 equal temperament of C, C#, D, D#, E, F, F#, G, G#, A, A#, B, vertically divided into 24 portions. Moreover, the total length of the horizontal axis is a length of integer-number bars (specifically, 4 bars) and, with a quarter note being a unit of the beat, the CPU 7 is caused to divide the horizontal axis into 16 portions. That is to say, the one digital picture-image 51 is, so as to correspond to the sound-pitch number 24 of the 2 octaves and the beat number 16 of the 16 musical-notes, divided into 24×16 blocks.

The Determining Function of the Block Representative-Color.

Since, in a block, multiple picture-elements are included depending on the resolution, a calculating method is described for which with a block representative-color determining part 19 the representative picture-element and the representative-color of the block are decided. Each picture-element is usually expressed with an RGB value of the RGB color model. An RGB value is, in many cases, color rendition information of a digital picture-image which has been obtained with an inputting device such as a camera, a scanner or the like, and is a color-specification value of the physical level. An RGB value is expressed with a mixed-color ratio of R (red), G (green), B (blue) which are the three-primary-colors of the colored-light, and does not correspond to the perception of a human. But, in the present embodiment, it is premised that a visual-sense characteristic of a human is obtained from a digital picture-image. For example, in processing for which the color range of a color name is set, or the color name is recognized from a block, a color-specification value which is close to the psychological level becomes necessary. As color-specification methods of the psychological level, the Munsell color system and the like based on hue (Hue), lightness (Value), chroma (Chroma) which are the three attributes of the color perception are publicly known but, in the present embodiment, since a conversion formula from the RGB values is publicly known and digital expression is relatively easy, the HSV color model configured from hue (Hue), saturation (Saturation), lightness (Value), which is close to the psychological level, is used. The conversion formula from the RGB values into the HSV values is, since being well known, omitted. In the present embodiment, the mode-value of the RGB values of the picture-elements inside the block is, after having been calculated by the CPU 7, converted to the HSV value, and the HSV value is utilized as the representative-value of the color attribute in the representative picture-element of the block, namely, the value of the representative-color of the block. In the method of calculation, instead of the mode-values, the average-values may be utilized.

The Representative-Color Mosaic Picture-Image Generating Function.

In the representative-color mosaic picture-image generating part 20, the block insides are painted out with the representative-colors, and the mosaic picture-image (hereinafter, the representative-color mosaic picture-image) by the representative-colors of the 24×16 blocks shown in FIG. 4 is generated by the CPU 7. Namely, each block has a color attribute of a single-color, and is identified with the position coordinates of the mosaic picture-image.

The Sound-Source Color Name/Color Range Setting Function.

While mainly referring to FIG. 5A, descriptions are performed. Here, FIG. 5A is a description view of the sound-source color name range setting manipulation screen of the embodiment in the present invention.

Temporarily digressing from the descriptions of the mosaic picture-image generation, the sound-source color name/color range setting function of a sound-source color name setting part 22 within a block color name recognizing part 21 is described. To a block, the color name (hereinafter, the sound-source color name) which shows the sound-source corresponding thereto is assigned. The sound-source color names individually correspond to the color ranges within the color space. The number of the sound-source color names and the color range of the sound-source color name are arbitrary but, in the present embodiment, the sound-source color names and the color ranges of seven colors of a red-color, an orange-color, a yellow-color, a green-color, a blue-color, a purple-color, a gray-color are set. Usually, the color space corresponding to the color names has, like the Munsell color system, 3-dimensional color attributes of the hue, the lightness, the saturation. In the present embodiment, the color ranges are set with the HSV color space which has 3-dimensional attributes. The sound-source color names individually define the ranges of the three dimensions, and the colors which are inside one color range are recognized to correspond to the sound-source color name thereof. In the present embodiment, each sound-source color name is, like the system-color-names of JIS, defined in such a manner that each color of the color space belongs to some color range and that there is no overlapping. But, a method for which, like the common-color-names of JIS, a color belonging to no color ranges exists within the color space may be utilized. The colors belonging to no color ranges are recognized to correspond to no sound-source color names. In the present embodiment, in such a manner that a user can easily alter/set the color range of the sound-source color name, a 2-dimensional diagram such as FIG. 5A is displayed in the displaying part 4 by the CPU 7. This is a 2-dimensional color pie-chart, where the outer-periphery is the hue axis and the radius from the center to the outer-periphery is the saturation axis. Each sound-source color name can be specified with the hue range by the angle of the fan-shape, and the saturation range by the proportion. Additionally, with this example, specifying of the lightness range of the sound-source color name is not used. As described later, the sound-source color is assigned to the sort of the sound-source.

The Sound-Source Color Name Recognizing Function.

A sound-source color name recognizing part 23 within the block color name recognizing part 21 is described.

It is confirmed that each block of the above described representative-color mosaic picture-image is painted out uniformly with the representative-color, and the color range of the sound-source color name to which the representative-color of each block belongs is recognized with the sound-source color name recognizing part 23. For example, in case the representative-color of the block belongs to the color range of the red-color (the angle of the fan-shape being from 321 degrees to 15 degrees, the saturation being 20 percent or more), the sound-source color name of the block is acknowledge to be the red-color. Like this, the sound-source color names of all the blocks of the mosaic picture-image are recognized.

Each color name (refer to FIG. 5A) such as the red-color, the orange-color, the yellow-color, and the like, which has been made to correspond to the range of the color attribute value, has to be made to correspond to a sound-source name (refer to FIG. 5B) such as the viola, the synthesizer strings 1, the string ensemble 1, and the like, in the step a music data generating part 28 executes, at the latest, but may not yet be made to correspond to a sound-source name in the step the sound-source color name recognizing part 23 executes.

The Sound-Source Color Mosaic Picture-Image Generating Function.

With a sound-source color mosaic picture-image generating part 24, each block is painted out with the color-value (the sound-source color) of the sound-source color name which has been recognized and, from the representative-color mosaic picture-image, a mosaic picture-image (hereinafter, a sound-source color mosaic picture-image) by the sound-source colors is generated (the sound-source color mosaic picture-image not shown in the drawings).

The Block Eliminating Function and the Musical-Note Candidate Extracting Function.

The function in the block selecting part 25 is described, for which the CPU 7 is caused to select the blocks necessary within the sound-source color mosaic picture-image, and thereby the musical-note candidates are extracted. In general, if the sound-sources which ring all at once are too many, then music which is noisy and uncomfortable is generated. For example, in a case where a picture-image is divided into 24×16 blocks, if sounds are assigned to all the blocks, then the sounds of the 24 sound-pitches (2 octaves) ring at all the beats, and exceedingly noisy music is generated. For such a reason, since it becomes necessary to properly thin out blocks from the picture-image and thereby generate music from the remaining blocks, considering that music having an auditory-sense characteristic appropriate to the visual-sense characteristic of the whole picture-image should be generated, blocks are eliminated from the sound-source color mosaic picture-image in accordance with the "eliminating parameters" of the color attribute and the position attribute.

Thinking from a viewpoint of the color perception in the visual-sense characteristic, if the saturation is not equal to or more than a constant, then a color is not easily perceived as a particular color. Accordingly, as the "eliminating parameter," a saturation parameter is set, and a block of a color of a certain threshold-value or less is eliminated. For example, in such a manner that a block of a color for which the saturation (Saturation) of the HSV color space is 30% or less is eliminated, setting is performed.

Further, regarding the lightness, because a human recognizes, in a case where the picture-image is too light, a block of a high lightness to be a block of a light-ray, the color of a block of a high lightness is not easily perceived as an object-color. Analogously, because a human recognizes, in a case where the picture-image is too dark, a block of a low lightness to be a block of a shadow, the color of a block of a low lightness is also not easily perceived as an object-color. Hence, a lightness parameter is set, and a block of a color of a certain threshold-value of a high lightness or more, and a block of a color of a certain threshold-value of a low lightness or less are eliminated. For example, in such a manner that a block of a color for which the lightness (Value) of the HSV color space is 70% or more, or 20% or less is eliminated, setting is performed.

Further, because attention of a human concentrates in the central portion of the picture-image, the focusing portion of a camera, and the portions of the face and the body of a person, a picture-image position parameter is set, and the blocks except for the blocks of those portions are eliminated. Consequently, a block remains which possess the shape of an object and the like, which is most easily perceived within the picture-image and is characteristical. Like this, unnecessary blocks are eliminated, and thereby the remaining blocks become musical-note candidate blocks.

The Setting Function of Sound-Sources.

While mainly referring to FIG. 5B, descriptions are performed. Here, FIG. 5B is a description view of the sound-source setting manipulation screen of the embodiment in the present invention.

With the sound-source setting part 26, the sound-source of a musical-note candidate block is determined. The above described sound-source color names and the color ranges are used for assignment of the sorts of the sound-sources. The assignment from the sound-source color to the sound-source may be fixed but, like FIG. 5B, with the displaying part 4 being caused to display a sound-source setting screen, a user may be caused to set a sound-source corresponding to a sound-source color name. Even with music of organization such as an orchestra by plural music-instruments, plural sound-sources can be easily set. Moreover, the color for which the stimulus-quantity is strongest within the picture-image is red and, except achromatic-colors, the color for which the stimulus-quantity is weakest is blue. For example, causing the stimulus-quantity of sound to be proportional to the above described stimulus-quantity of color of the picture-image, the stringed music-instrument sound-source for which the stimulus of sound is strong can be set to the red-color, and the woodwind music-instrument sound-source for which the stimulus-quantity of sound is weak can be set to the blue-color. Like this, from the colors and the sound-sources, correlation between the picture-image and the music can be easily generated. Incidentally, known in color-arrangement of figurative arts and the like is the color-perspective-method making use of an effect such that a human psychologically feels that the red for which the stimulus-quantity is strong means advance, and the blue for which the stimulus-quantity is weak means regression. Moreover, in disposition of the sound-sources of the music-instrument organization of an orchestra and the like, the stringed music-instruments such as a violin for which the stimulus-quantity is strong are disposed at the stage front-part, the woodwind music-instruments such as a flute for which the stimulus-quantity is weak are disposed at the stage rear-part, and thereby the perspective-sensation of sound is caused to be strong. Like this, since the strength-and-weakness of the stimulus-quantity of color and the strength-and-weakness of the stimulus-quantity of sound are caused to correspond, a psychological effect such that by sound the perspective-sensation of the picture-image is strengthened can be expected. Like this, to all the musical-note candidate blocks sound-sources are assigned.

Next, a method is describe for which in the diagram music-score generating part 27, a block diagram full-score is generated.

The Musical-Note Creating Function Making Use of Musical-Note Candidates.

A method is describe for which from the above described musical-note candidate block, a musical-note is created. In general, a musical-note represents a length of sound (a note-value), a time position of sound, and a pitch of sound (a sound-pitch). In the present embodiment, the time position of sound and the sound-pitch are uniquely defined from the position of the block within the representative-color mosaic picture-image. For example, in the representative-color mosaic picture-image of FIG. 4 which has been divided into 24×16 blocks, the block A at the 3rd position from the left and at the 6th position from the top is the 3rd beat of the 1st bar in four-four time, and the sound-pitch is G. On the other hand, the length of sound (the note-value) is defined from the relations with the other musical-note candidate blocks. For example, in a case where the scale of the horizontal axis corresponds to the length of 4 bars and a tune is generated in four-four time, since the picture-image is divided into 16 blocks regarding the direction of the horizontal axis, the horizontal width of one block corresponds to a quarter note.

In this case, an isolated musical-note candidate block is made to correspond to a quarter note, but the CPU 7 is caused to carry out execution, in such a manner that the 2 musical-note candidate blocks are made to correspond to a half note in case there are 2 musical-note candidate blocks which are consecutive in the direction of the horizontal axis, that the 3 musical-note candidate blocks are made to correspond to a dotted half-note in case there are 3 musical-note candidate blocks which are consecutive, and that the 4 musical-note candidate blocks are made to correspond to a whole note in case there are 4 musical-note candidate blocks which are consecutive. For example, in case there are 2 musical-note candidate blocks which sandwich a bar line and are consecutive in the direction of the horizontal axis, the 2 quarter notes corresponding to the 2 musical-note candidate blocks may be tied with a tie, or may not be tied. In a case where a tune is generated in four-eight time, the picture-image is divided into 32 blocks regarding the direction of the horizontal axis, and the CPU 7 is caused to execute analogous processing.

In the present embodiment, the CPU 7 has been caused to determine note-values from the horizontal position relations of musical-note candidate blocks but, with musical-note candidate blocks being in an obliquely horizontal position relation, the sound-pitches may change. For example, the musical-notes corresponding to musical-note candidate blocks which are in close proximity and are in an obliquely horizontal position relation may be tied with a slur, or may not be tied.

Like this, from musical-note candidate blocks, a musical-note is generated which is configured from a length of sound (a note-value), a pitch of sound (a sound-pitch), a beat of sound.

The Block Diagram Full-Score Generating Function.

Figure 6:
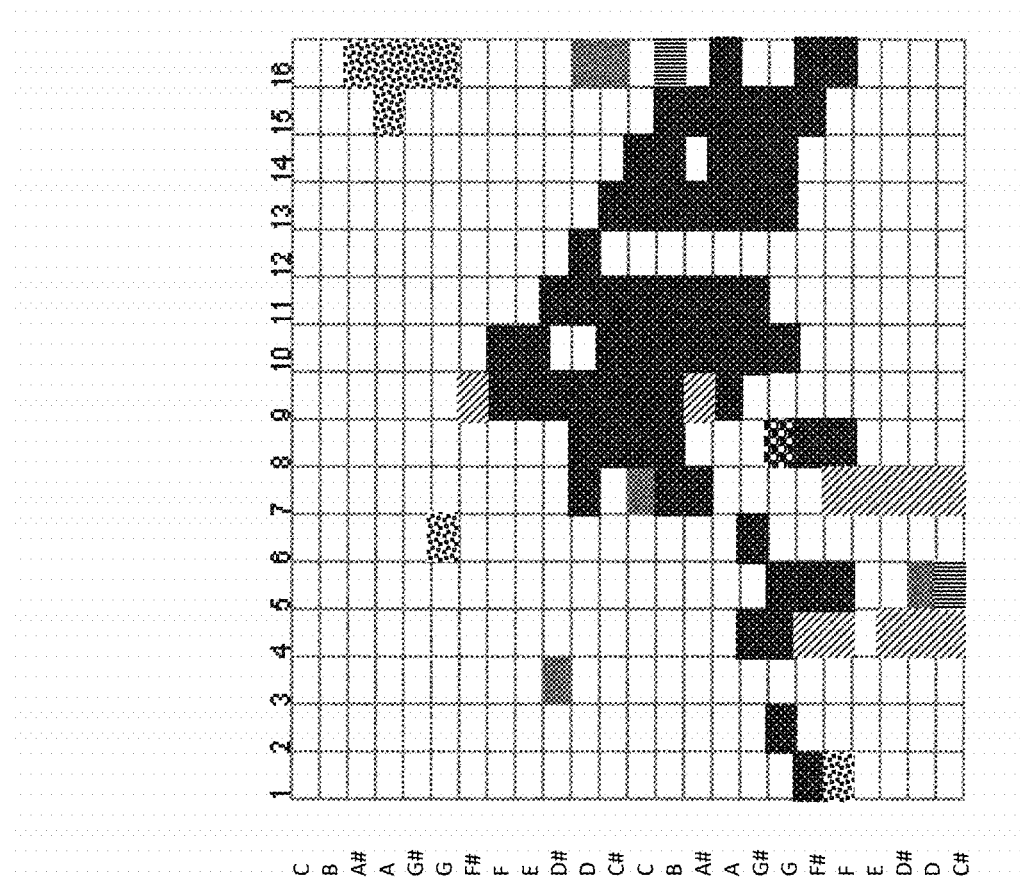
FIG. 6 is a description view of the block diagram full-score of the embodiment in the present invention.

While mainly referring to FIG. 6, descriptions are performed. Here, FIG. 6 is a description view of the block diagram full-score of the embodiment in the present invention.

By 2-dimensionally disposing the musical-notes which have been generated from musical-note candidate blocks as described above, a block diagram full-score can be automatically generated from the digital picture-image 51. An example of the block diagram full-score is shown in FIG. 6. Additionally, with the diagram music-score generating part 27, not only the above described block diagram full-score, but also a harmony-tone correction diagram full-score and a part-score, which are described later, are generated depending on the necessity (hereinafter, any of these is called a diagram music-score).

Subsequently, the music data generating part 28 is describe. With the music data generating part 28, correction of harmony-tone, setting of tonality, and setting of strength of sound are performed depending on the setting of a user, and the music data 54 is generated.

The Tonality Setting Function.

To set tonality to music, for example, in the block diagram music-score of FIG. 6, the sound-pitch for which the blocks are many is determined as the tonic. In this case, G (sol) becomes the tonic. To judge whether the appropriate key is a major key or is a minor key, in such a manner that the auditory-sense impression and the visual-sense impression are similar, the appropriate key is judged to be a major key in case the picture-image is light and vivid, and the appropriate key is judged to be a minor key in case the picture-image is dark and subdued. For example, the parameter of lightness, the parameter of saturation are set beforehand, the appropriate key is judged to be a major key in case the average lightness of the whole picture-image is 50% or more and the average saturation of the whole picture-image is 50% or more, and the appropriate key is judged to be a minor key in case at least one of the average lightness and the average saturation is less than 50%. Of course, since people differ in sensation, the parameters may be altered. In the case of a major key, only the sound-pitches of the major scale based on the tonic become valid, and the other sound-pitches are not rung. In this case, G, A, B, C, D, E, F# become valid, and the appropriate key is G major. In the case of a minor key, only the sound-pitches of the minor scale based on the tonic become valid, and the other sound-pitches are not rung. In this case, G, A, B♭, C, D, E♭, F# become valid (a harmonic minor scale), and the appropriate key is G minor.

The Harmony-Tone Correcting Function.

Figure 7:
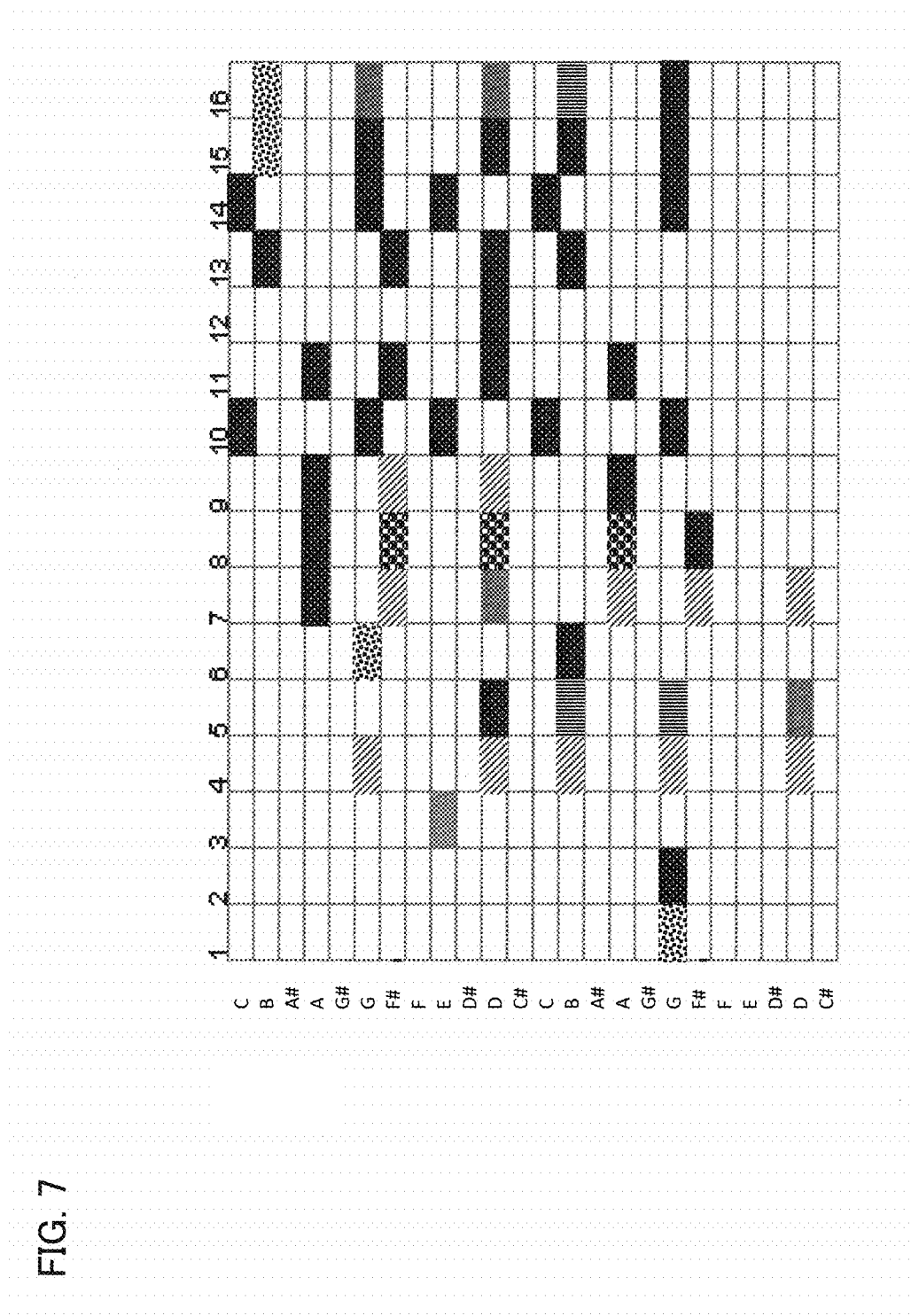
FIG. 7 is a description view of the harmony-tone correction diagram full-score of the embodiment in the present invention.

While mainly referring to FIG. 7, descriptions are performed. Here, FIG. 7 is a description view of the harmony-tone correction diagram full-score of the embodiment in the present invention.

The above described method provides, by validating only 7 sound-pitches within the 12 sound-pitches, tonality to music, but a method is describe for which dissonances included therein are eliminated and corrected to consonances, and thereby the music is further made to be musically pleasing. To carry out conversion from the block diagram music-score of FIG. 6 to the harmony-tone correction diagram music-score of FIG. 7, a harmony-tone is determined at each column corresponding to each beat and the blocks are rearranged. Basically, a harmony-tone is a triad based on the first, the third, the fifth, but the seventh may be added. In the harmony-tone of each column, the root is determined as a particular sound-pitch, which is amply included in the 7 sound-pitches of the key having been judged in the block diagram music-score, also considering closeness and the like with sound-pitches included in the 7 sound-pitches of the key regarding a sound-pitch out of the 7 sound-pitches of the key, and the chord of a triad is judged. In the case of the harmony-tone correction diagram music-score of FIG. 7, regarding the chord of the 4th column from the left, the chord of the 5th column, the roots are judged as G, and the blocks are shifted to G, B or D. Nevertheless, since the impression largely varies if a block-number increases, the block-number is not altered. Moreover, also when the block-number is less than 3, the root and the chord are judged, but setting is carried out only with 1 sound or 2 sounds. For example, at the 1st column of FIG. 6 a block of F# and a block of F are lined up in the up-and-down direction, but the two blocks are shifted to G which is the tonic of G major, and the chord of G is set. Like this, in a case and the like where the sound-number is small, regarding the determination of a chord, principal chords such as a tonic triad, a dominant triad, a subdominant triad and the like are viewed as important. Nevertheless, because there are innumerable methods of harmony, the harmony-tone correction method is not limited to the above described method.

Of course, a diagram music-score may be generated with harmony-tone correction for producing harmony-tone being utilized, or may be generated with harmony-tone correction not being utilized. For example, a diagram music-score may be immediately completed by selecting designated blocks without harmony-tone correction. And, the scale of the vertical axis (refer to FIG. 4) of the digital picture-image 51 may be set beforehand in such a manner that harmony-tone correction becomes unnecessary. Further, the music data generating part 28 may have a function for which harmony-tone correction is performed.

The Sound Strength Setting Function.

Regarding the strength of sound of each musical-note, for example, the strength is caused to be proportional to the lightness of the block and thereby the strength-and-weakness can be decided.

The Generation of Diagram Music-Scores.

Figure 8:
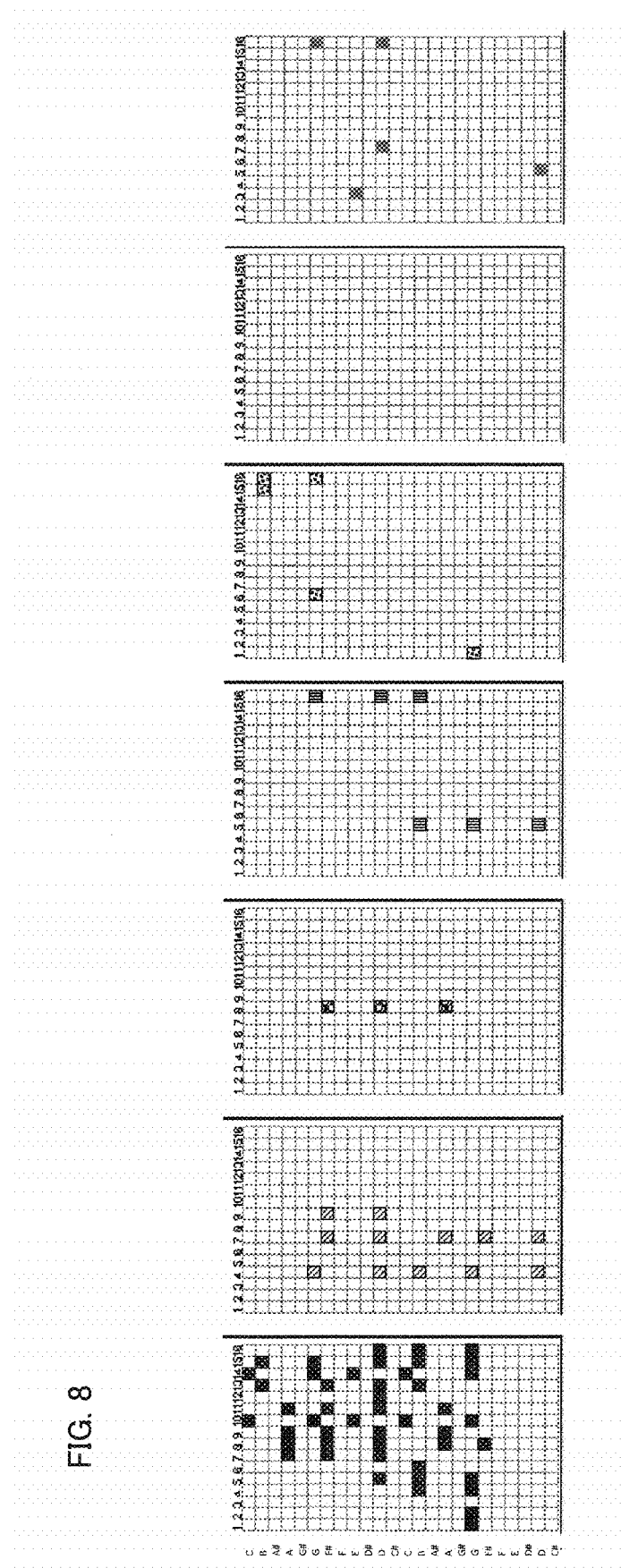
FIG. 8 is a description view of the harmony-tone correction part-scores of the embodiment in the present invention.

While mainly referring to FIG. 8, descriptions are performed. Here, FIG. 8 is a description view of the harmony-tone correction part-scores of the embodiment in the present invention.

Descriptions are given regarding the diagram music-score generating part 27.

A block diagram full-score and a harmony-tone correction diagram full-score are used for generating the music data 54 including the sound-pitches, the note-values, the beat, the harmony-tone, the strength, the key, the music-instruments and the like, which are music fundamental elements becoming necessary later for playing of the music. Moreover, in case a harmony-tone correction diagram full-score is caused to decompose based on the color-value of each sound-source color name, like FIG. 8, harmony-tone correction part-scores are created. Hereinafter, a block diagram full-score is called a full-score, but a harmony-tone correction diagram full-score is also called a full-score, and a harmony-tone correction part-score is simply called a part-score. Moreover, full-score data are called diagram music-score data, but part-score data are also called diagram music-score data. Diagram music-score data are memorized in the diagram music-score memorizing part 16. Part-score data are used in a case where the music data having been generated only with the sound-sources of a part of the parts are reproduced, in a case where the contents of the music data having been generated are investigated regarding each part, or the like The block diagram full-score of FIG. 6, the harmony-tone correction diagram full-score of FIG. 7, and the part-scores of FIG. 8 are being displayed with color-separated square-block-shaped musical-notes but, of course, it goes without saying that these can be displayed with musical-notes of conventional five-line staff musical-notation.

The above described diagram music-score (a full-score or a part-score) may be displayed in the displaying part 4 by a diagram music-score reproducing part 32 and thereby shown to a user. By means of this, evaluation of the music which has been generated can be objectively performed, and partial revision can also be easily performed.

The Music Data Generation.

Figure 9:
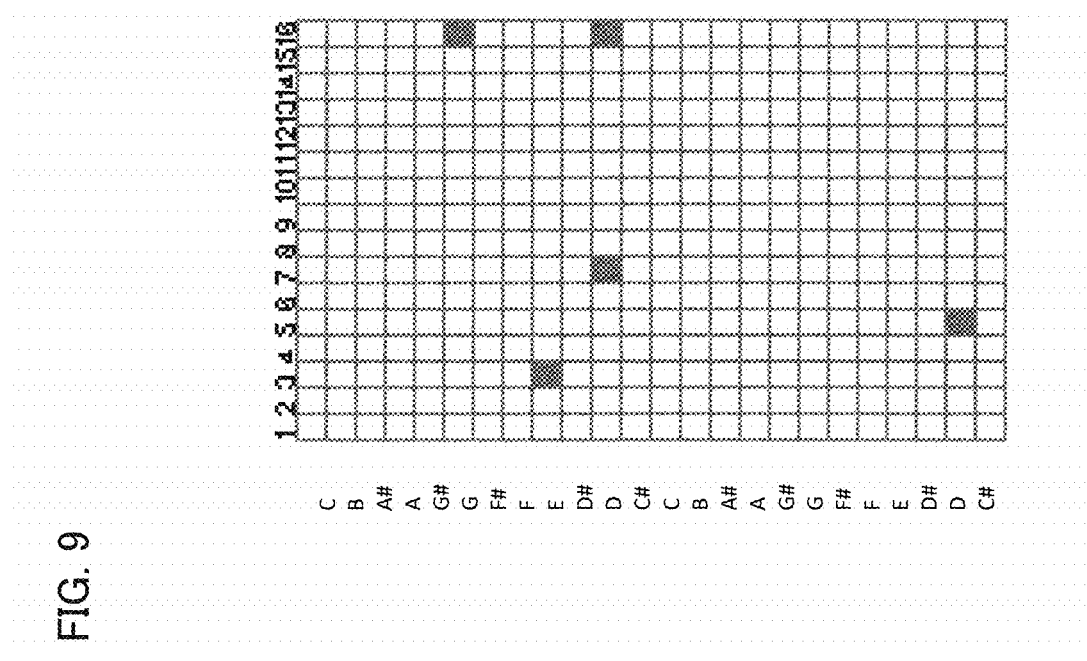
FIG. 9 is a description view of the piano part-score of the embodiment in the present invention.

While mainly referring to FIG. 9, descriptions are performed. Here, FIG. 9 is a description view of the piano part-score of the embodiment in the present invention.

Processing is describe for which from a full-score or a part-score, music data are generated. The music data 54 represent playing information of music such as the timing of pronunciation, the pitches of sound, the strength of sound, the music-instruments and the like with symbolic information which can be easily treated with the CPU 7. For example, MIDI is used for the music data 54. Descriptions are given taking the piano part-score of FIG. 9 for an example. For example, if with the sound-source setting screen of FIG. 5B the sound-source for which the sound-source color name is the gray-color is set by a user to the piano (the acoustic piano), then the music data 54 including the information (called the sound-source data address information) of the sound-source data 52 of the piano are generated by the CPU 7 in accordance with the instructions of the piano part-score of FIG. 9. And, also regarding the remainder of the colors, the music data 54 are generated from the sound-source colors having been set and individual part-scores, those are combined, and thereby the music data 54 to play are ultimately finished. The music data 54 having been generated are recorded in the music data memorizing part 17.

The Reproduction of Music.

A music reproducing part 33 is describe. Since the music data 54 are symbolic data such as MIDI or the like, for ringing the sounds with a speaker or the like, it is necessary to convert the music data 54 to waveforms of sound. With the music reproducing part 33, making use of the sound-source data address information within the music data 54, the sound-source waveform data of the sound-source data 52 within the sound-source data memorizing part are read in and thereby the music data 54 are converted to waveforms. For example, in a case of the music data 54 being MIDI, conversion to the waveform information is carried out making use of a MIDI sequencer, a MIDI synthesizer and the like.

The Reproduction of Picture-Images and Music.

The music waveforms which have been generated as described above are reproduced, and through the audio-sound outputting part 5 the sounds flow. Of course, by the CPU 7, with a picture-image reproducing part 31 the displaying of the digital picture-image 51 is able to be caused to synchronize with the reproduction of the music.

The Manipulation Screen Displaying Function.

While mainly referring to FIGS. 5A to 5C, descriptions are performed. Here, FIG. 5C is a description view of the picture-image music conversion adjustment setting manipulation screen of the embodiment in the present invention.

In accordance with the examples of a user setting screen of FIGS. 5A to 5C the function is described for which at a time when music is generated from a picture-image, the displaying part 4 is caused to display the manipulation entries a user is caused to set. It is enough that with the sound-source color name setting screen (refer to FIG. 5A), a user sets the angle numerical-value of the fan-shape of the hue of each color name and the proportion of the saturation in accordance with manipulation of each adjustment window, and user setting is simple. Moreover, since in accordance with those adjustment values, the angle lines of the color pie-chart of the right figure, and the size of the circle at the inner-side move, a user can intuitively know the color ranges. With the sound-source setting screen (refer to FIG. 5B), since the color name and the music-instrument are lined up and displayed, and a menu screen fashion has been adopted regarding the sound-source setting, a user can easily carry out setting. With the picture-image music conversion adjustment screen (refer to FIG. 5C), by the above described eliminating parameters and the like of the color attribute and the position attribute, a user can easily adjust principal adjustment functions with slidebar manipulation.

Up to here, processing has been describe for which a music-score is created from one picture-image and music is generated, but next a case is describe where a picture-image, a music-score and music for a slideshow which consecutively displays plural picture-images are generated/reproduced.

The Slideshow Creating Function.

In the first place, in a slideshow generating part 29, plural digital picture-images 51 which become the subjects of a slideshow are chosen from among the digital picture-images 51 which have been memorized in the data memorizing part 9 from the manipulation inputting part 2. Next, the above described processing is performed to each of the digital picture-images 51 which have been chosen and thereby the corresponding music data 54 are generated. The music data 54 are, as input of the slideshow, memorized in the music data memorizing part 17. At that time, the information having related, with each of the digital picture-images 51, the music data 54 which have been generated therefrom is also memorized in the main memorizing part 8.

The Slideshow Reproducing Function.

Figure 10:
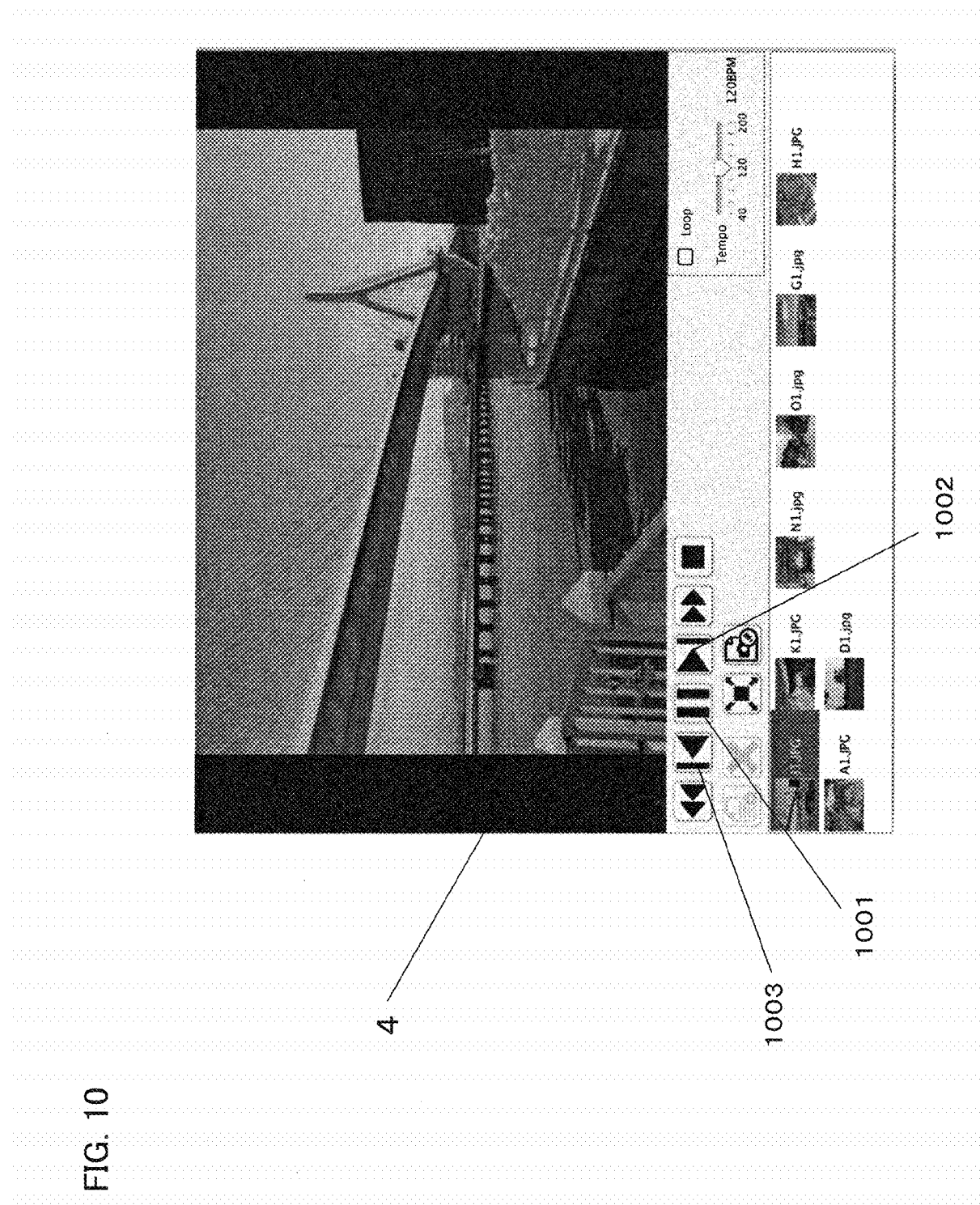
FIG. 10 is a description view of the slideshow reproducing manipulation screen of the embodiment in the present invention.

While mainly referring to FIG. 10, descriptions are performed. Here, FIG. 10 is a description view of the slideshow reproducing manipulation screen of the embodiment in the present invention.

For reproduction of a slideshow, by a slideshow reproducing part 34, the slideshow manipulation screen of FIG. 10 is displayed in the displaying part 4, and a user touches an icon 1001 of "PLAY/STOP," an icon 1002 of "FORWARD," an icon 1003 of "REVERSE" and the like, and thereby controls the reproduction of the slideshow. For example, if an instruction of the "PLAY/STOP" is initially carried out, then the initial digital picture-image is took out from among the digital picture-images 51 which have been memorized in the picture-image memorizing part 14, the music data 54 which have been related thereto are took out from the music data memorizing part 17 at the same time, and thereby, with both being synchronized, the music is outputted to the audio-sound outputting part 5 while the picture-image is outputted to the displaying part 4. Since the digital picture-image 51 is a still picture, the picture-image which has been displayed in the displaying part 4 does not change but, in case the playing of the music data 54 which correspond comes to an end, the next digital picture-image 51 and the music data 54 are took out, and the picture-images and the music are reproduced one by one in turn until those data are exhausted. Additionally, with a screen effect such as a dissolve, a pan or the like, a screen may be caused to change. Also regarding the "FORWARD," the "REVERSE" and the like, the music data 54 which have been related with the digital picture-image 51 are took out in the same manner and thereby a slideshow is performed.

Moreover, there is a case where a user wants to create, from plural picture-images, taking advantage of the characteristics of individual picture-images, a slideshow work having one tune. For example, the tune is started with light music, transition to dark music is carried out, and the tune is finally ended with light music. Moreover, there is a case where a user wants to create, choosing only the picture-images which satisfy a certain condition, a slideshow work having one tune. For example, from among the picture-images which have been temporarily chosen as the subjects of a slideshow, only the picture-images which generate light music are automatically chosen, and thereby a slideshow work is created.

For that purpose, at a time when the digital picture-images 51 of a slideshow and the music data 54 are generated and thereby memorized, the pattern of the above described full-score of each picture-image is measured and converted to a numerical-value. And, utilizing the numerical-values thereof, the turns of the digital picture-image 51 and the music data 54 are altered and thereby the turn of the slideshow is determined. For example, in the above described case where a tune is generated for which light music, dark music, light music transition in turn, paying attention to the lightness of the full-score, the numerical-values which are generated from the patterns having been measured are separated into 3 groups of "HIGH," "MIDDLE," "LOW" with threshold-values, and the turns are altered in such a manner that a picture-image for which the numerical-value is of "HIGH" is positioned in the part of the final light music, that a picture-image for which the numerical-value is of "MIDDLE" is positioned in the part of the initial light music, and that a picture-image for which the numerical-value is of "LOW" is positioned in the part of the dark music. By doing this, the slideshow can be reproduced with a turn of the tune in such a manner that the tune is started with light music, that transition to dark music is carried out, and that the tune is finally ended with extremely light music.

Moreover, in a case where only light music is chosen, only a picture-image for which the numerical-value generated from the pattern of the full-score is of "HIGH" or of "MIDDLE" is kept remaining, a picture-image for which the numerical-value is of "LOW" is deleted from a temporary memory, and thereby a slideshow can be reproduced only with light music.

The Creating/Reproducing Function of Moving-Picture Data.

At a time when a slideshow is reproduced, with the above described method digital picture-images and music data have been sequentially interpreted and reproduced, but there is further a method for which moving-picture data of a moving-picture file format defined as an industry-standard such as MP4, MOV or the like are temporarily created from the digital picture-images 51 and the music data 54. With this method, from the digital picture-images 51 and the music data 54 for which the turns are determined with the above described method, moving-picture data including the synchronization information are created as a moving-picture file. Regarding the moving-picture data creation of a moving-picture file format, since various methods are known, descriptions are omitted.

Additionally, the above described moving-picture is not a moving-picture for which movement is expressed by consecutively displaying different picture-image frames, such as 24, 30, or 60 picture-image frames or the like per 1 second, and is a moving-picture for which the same still picture-image is displayed throughout an arbitrary time and the music is reproduced so as to synchronize with the displaying time.

For example, in a case where music for 7 seconds has been generated using one still picture-image, the same still picture-image is displayed throughout 7 seconds, and the music for 7 seconds which has been generated is reproduced so as to synchronize with the picture-image displaying. At this time, the moving-picture data which have been created as a moving-picture file are reproduced by a moving-picture reproducing part 35 but, since the same picture-image frame is merely displayed repeatedly with a designated frame rate, expression of movement is of course not accompanied.

That is to say, since a moving-picture file creating part 30 creates moving-picture data with a moving-picture file format of an industry-standard being reproducible with many reproducing devices, a function being analogous with the above described slideshow reproducing function of still picture-images is realized as a moving-picture data reproducing function.

One still picture-image may be used, or plural still picture-images may be used. Moreover, considering the switching timing of displaying, or the music which is reproduced at the same time, an effect may be added to a still picture-image.

Since moving-picture data of a moving-picture file format are, with various media players, browsers or the like, reproducible as they are, a slideshow which has been created with this method can be reproduced with many apparatuses or software.

The Communicating Function of Picture-Image Music.

Up to here, a situation has been describe for which music is generated from a picture-image with one apparatus and thereby is reproduced with the same apparatus, but next a method is describe for which music is generated from a picture-image with a certain apparatus and thereby is forwarded to another apparatus and reproduced along with the picture-image.

In the first place, with the apparatus at the sending-side, music is generated from one or plural picture-images with the above described method. And, the picture-images and the music are sent from the external communicating part 6 to the apparatus at the receiving-side of the partner. Regarding the method of sending, various methods, such as a local network of the house-inside, network communication using the Internet and the like via a public-line-network for which the address at the partner-side has been specified, a method via a temporary storing device of a portable-type such as an USB memory or the like, and the like are utilizable but, in the present embodiment, descriptions are given with communication using the Internet. The data relating to picture-images and music which are sent at this time are classified into the first type for which moving-picture data are utilized, the second type for which picture-images and music data are utilized, the third type for which picture-images and a full-score or a part-score are utilized.

With the first type, with the above described method, moving-picture data of a slideshow including picture-images and music are generated on the sending-side, and the moving-picture data thereof is sent to the receiving-side. On the receiving-side, by reproducing the moving-picture data which have been received, the slideshow having been intended at the sending-side can be viewed. At this time, since the moving-picture data are created with a moving-picture file format of an industry-standard such as MP4, MOV or the like, on the receiving-side, even if there is not a device of the present embodiment or software, the slideshow can be viewed making use of standard software such as a media player, a browser or the like. But, with this method, none of the alteration of the contents of the slideshow, the evaluation of the music-score, the revision of the music-score, the musical-arrangement, and the like can be carried out.

With the second type, with the above described method, from the digital picture-images 51 the music data 54 which correspond thereto are generated on the sending-side, and the digital picture-images 51 and the music data 54 are paired and thereby sent to the receiving-side. On the receiving-side, from the music data 54 which have been received, music is generated making use of the sound-source data 52 within the sound-source memorizing part 15 of the apparatus at the receiving-side, the music is combined with the digital picture-images 51 which have been received, and thereby a slideshow is reproduced. With this method, the sound-source data 52 are replaced on the receiving-side and thereby, even if the sound-sources are the same, the music can be reproduced with the sounds of waveforms different to the waveforms at the sending-side. Moreover, on the receiving-side, replacement of the turn of the slideshow, and evaluation of the music-score can be carried out, but none of the revision of the music-score, the musical-arrangement, and the like can be carried out.

With the third type, a full-score or a part-score, which is created with the above described method at a time when the music data 54 are generated on the sending-side from the digital picture-images 51, is paired with the digital picture-images 51 and thereby sent to the receiving-side. On the receiving-side, from the full-score (the part-score) which has been received, music is generated making use of the sound-source data 52 within the sound-source memorizing part 15 of the apparatus at the receiving-side, the music is combined with the digital picture-images 51 which have been received, and thereby a slideshow is reproduced. With this method, on the receiving-side, not only can replacement of the turn of the slideshow and the sound-sources be carried out, but revision of the music-score, musical-arrangement, new organization of the band or the like can be carried out.

As described above, in a case of the first type where moving-picture data are sent/received, on the receiving-side the moving-picture intended at the sending-side can be reproduced as it is, in a case of the second type where picture-images and music data are sent/received, replacement of the sound-sources and the turns of the picture-images can be carried out on the receiving-side and, in a case of the third type where picture-images and a full-score or a part-score are sent/received, music-score revision, musical-arrangement, and even new band organization can be performed on the receiving-side.

The Descriptions of Each Function by a Flowchart.

Figure 11:
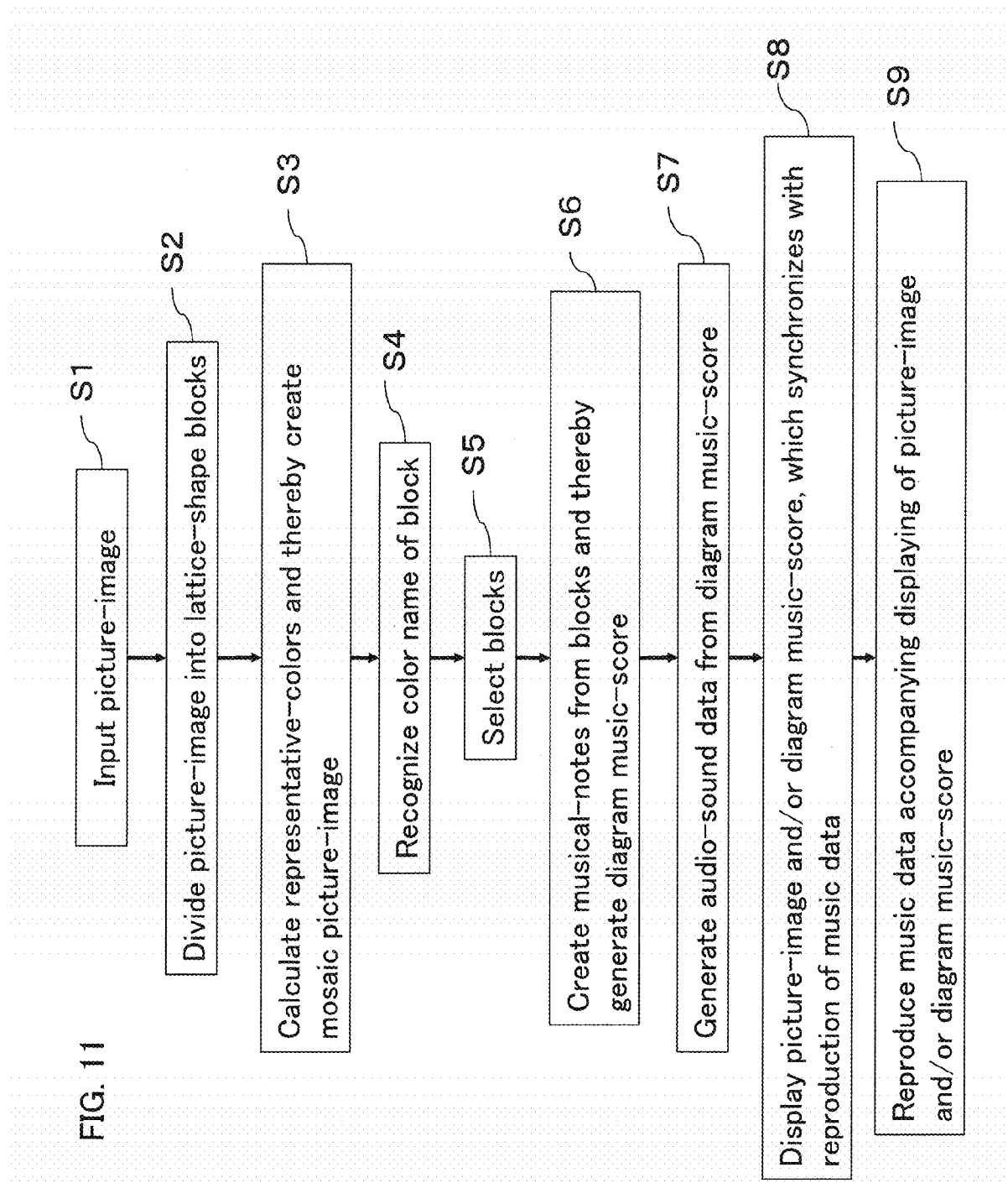
FIG. 11 is a flowchart which shows the controlling part inside function order of the embodiment in the present invention.

While mainly referring to FIG. 11, descriptions are performed. Here, FIG. 11 is a flowchart which shows the controlling part inside function order of the embodiment in the present invention.

Each of the above described processings for which the music data 54 are generated/reproduced from the digital picture-image 51 is describe by the function-type flowchart of FIG. 11 which shows, in accordance with the order, each function having been realized using the CPU 7 and the data processing program 11.

In the first place, the digital picture-image 51 within the picture-image inputting part 3 is inputted to the data memorizing part 9 (S1). This digital picture-image 51 is divided into the lattice-shape blocks of a user-desired number, for which the vertical axis corresponds to the sound-pitch and the horizontal axis corresponds to the beat (S2).

The multiple RGB picture-elements inside each block are calculated, the representative-value is acquired, the RGB/HSV conversion is carried out, and thereby the representative-color mosaic picture-image of the color attribute value is created (S3).

The representative-color of each block is fitted to the color-value (the sound-source color) of the sound-source color name, and the sound-source color mosaic picture-image is created (S4).

The blocks of the sound-source color mosaic picture-image are evaluated by an evaluation function of the block eliminating parameters of the color attribute and the block position, unnecessary blocks are eliminated by the function values thereof, and thereby the musical-note candidate blocks are selected (S5).

From the color name musical-note candidate blocks, various music element values (the sound-pitch, the note-value, the beat, the music-instrument, the tonality, the harmony-tone and the like) are decided, and thereby the color-separated block diagram musical-notes and the diagram music-scores (the full-score and the part-scores) are generated (S6).

From the diagram music-scores the music data having various music element values are generated (S7). While a picture-image and/or a diagram music-score which synchronizes with the reproduction of the music data is displayed (S8), in accordance with manipulation of the setting screen a user desires, the music data are reproduced, which accompany the displaying of the picture-image and/or the diagram music-score by a slideshow, a moving-picture or the like (S9).

A user can, by manipulation of the manipulation inputting part 2, reproduce the picture-image and the music, and thereby listen to the music through the speaker of the audio-sound outputting part 5. Moreover, a mobile-apparatus such as a smartphone, a PC, a tablet or the like, which incorporates a configuration of a generating/reproducing device of picture-image music such as FIG. 1, can send/receive music data through the external communicating part 6. Moreover, software which has the above described flowchart configuration of FIG. 11 can be recorded in a recording medium, or be associated with other application software.

The Configuration and Operations of a Picture-image Music Generating/Reproducing Cloud System 100.

Figure 12:
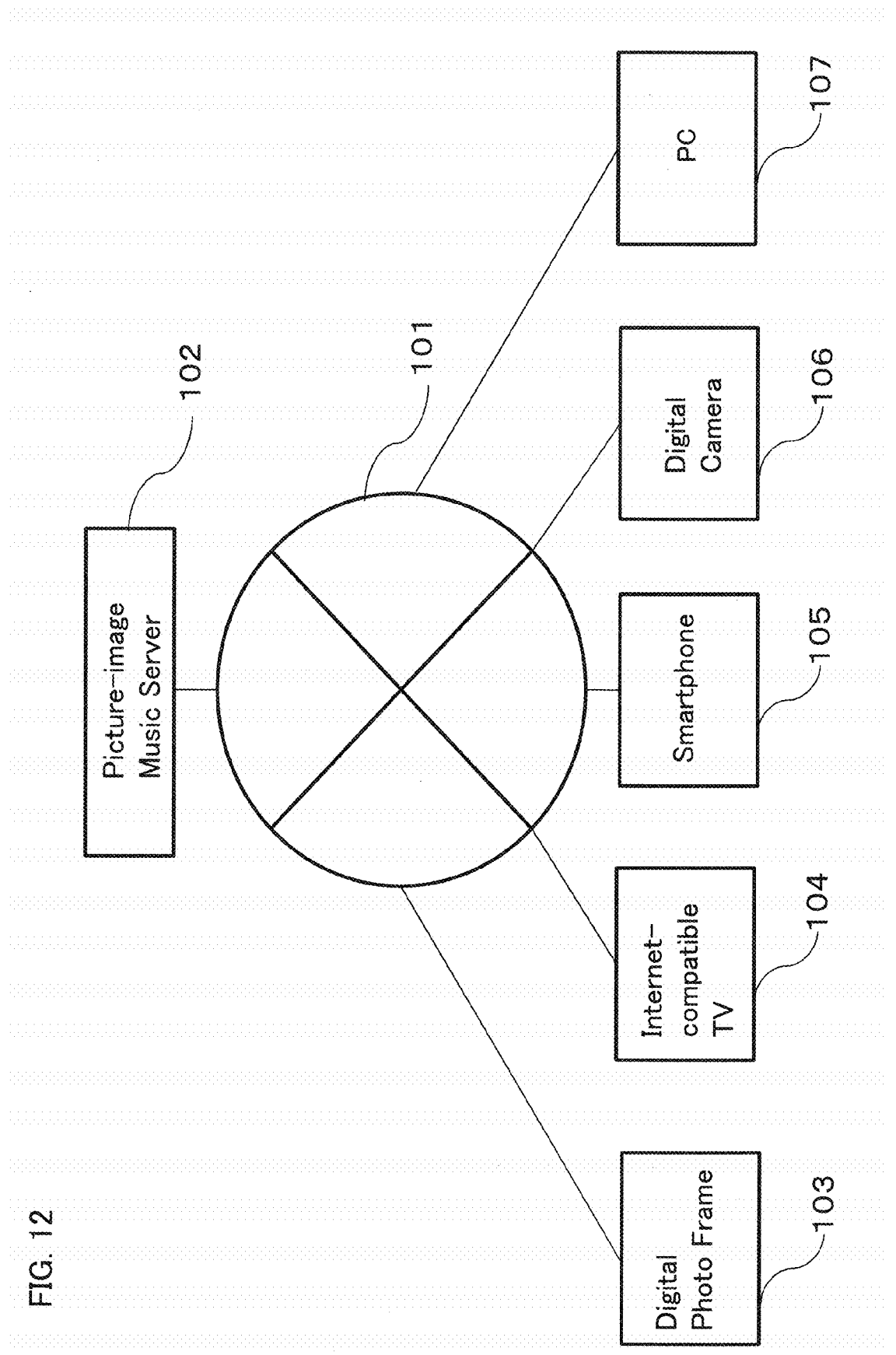
FIG. 12 is a configuration view of the picture-image music generating/reproducing cloud system of the embodiment in the present invention.

While mainly referring to FIG. 12, descriptions are performed. Here, FIG. 12 is a configuration view of the picture-image music generating/reproducing cloud system 100 of the embodiment in the present invention.

The picture-image music generating/reproducing cloud system 100 is describe in accordance with FIG. 12. To a wireless or wired Internet-network 101, various terminals such as the picture-image music server 102, the digital photo frame 103, the Internet-compatible TV 104, the smartphone 105, the digital camera 106, the PC 107 and the like are connected.

Each of these terminals incorporates a configuration of the picture-image music generating device of FIG. 1. Within these terminals, there is a terminal of a sort which incorporates a camera function, and thereby can carry out photographing of a picture-image therewith and upload the picture-image to the picture-image music server 102. On the other hand, there is also a terminal which does not incorporate a camera function (namely, a terminal which does not have the picture-image inputting part 3). Moreover, there are a terminal which includes a screen and a speaker, and can download from the server music and a slideshow which have been generated and reproduce those, and a terminal which cannot download from the server music and/or a slideshow which have been generated and reproduce those (namely, a terminal which does not have the displaying part 4 and/or the audio-sound outputting part 5). In the present embodiment, a terminal having a camera function is called an inputting terminal, and a terminal having a function for which music and a slideshow can be reproduced with a screen and a speaker is called an outputting terminal. Moreover, a terminal having both of the functions is called an inputting/outputting terminal. For example, the digital photo frame 103, the Internet-compatible TV 104 are outputting terminals, the digital camera 106 is an inputting terminal, and the smartphone 105, the PC 107 are inputting/outputting terminals.

A digital picture-image, which has been recorded after photographing with an inputting terminal or an inputting/outputting terminal, is forwarded to the picture-image music server 102 via the Internet-network 101. The picture-image music server 102 incorporates a configuration of the picture-image music generating device of FIG. 1, and generates the above described diagram music-score data 53 and/or the music data 54 from the digital picture-image 51 which has been forwarded from the terminal-side.

The diagram music-score data 53 and/or the music data 54 which have been generated are stored in the database of the picture-image music server 102, along with the digital picture-image 51 which has been forwarded from the terminal-side. In the database, recognition information such as the user name of a user who has forwarded the digital picture-image, the terminal ID and the like are also recorded together. Of course, not only one digital picture-image and diagram music-score data or music data, but also a slideshow which is configured from plural digital picture-images and diagram music-score data/music data as described above can be recorded in the database.

On the other hand, making use of an outputting terminal or an inputting/outputting terminal, a user can carry out a search of a digital picture-image and diagram music-score data/music data, and a slideshow, which have been recorded on the database. In a case where to the user who uploaded a digital picture-image, a user who has carried out a search is different, access restriction is usually performed, and only a user for whom access is permitted can access these data.

In a case of a request for which access is permitted, the picture-image music server 102 sends, to the terminal (usually, an outputting terminal or an inputting/outputting terminal) which has produced the request, a digital picture-image and diagram music-score data/music data, or a slideshow. The terminal-side includes all parts or a part of the picture-image music generating device of FIG. 1, receives data from the picture-image music server 102 and thereby memorizes the data in the data memorizing part 9. Specifically, a digital picture-image is memorized in the picture-image memorizing part 14 as the digital picture-image 51, diagram music-score data are memorized in the diagram music-score memorizing part 16 as the diagram music-score data 53, and music data are memorized in the music data memorizing part 17 as the music data 54.

The data processing program 11 of the terminal which has received data performs, using these data, the above described processing but, by utilizing the data which have been processed with the picture-image music server 102, processing on the terminal-side can be omitted. For example, in a case where diagram music-score data have been received, the processing of FIG. 2 from the block dividing part 18 to the diagram music-score generating part 27 can be omitted. Moreover, in a case where music data have been received, the processing of FIG. 2 from the block dividing part 18 to the music data generating part 28 can be omitted. Moreover, in a case where data of a slideshow have been received, the processing of the slideshow generating part 29 can be omitted.

Additionally, in the present embodiment, the digital picture-image 51 used for the generation of the music data 54 is forwarded from the picture-image music server 102 to the terminal, but it is not necessary to do so. For example, a digital picture-image which is being memorized in the terminal may be made use of, or a digital picture-image of another picture-image server may be used. Moreover, the picture-image music server 102 may forward a digital picture-image different to the digital picture-image 51 used for the generation of the music data 54 by the picture-image music server 102. By doing so, a picture-image music conversion service in such a manner that the picture-quality of a digital picture-image is varied depending on the level of the service can be furnished.

Moreover, in the present embodiment, the picture-image music server 102 generates data and thereby forwards the data which have been generated to the terminal, but the data may be forwarded to another server. By doing so, an Internet service for which a picture-image music conversion service is combined with a service another server furnishes can be furnished.

Moreover, in the present embodiment, the picture-image music server 102 sends, to the terminal of a user who has issued a request, a digital picture-image and diagram music-score data/music data, or a slideshow, but moving-picture data may be sent.

As described in the above, by automatically creating, from the color attribute value the picture-element block of the picture-image has, a diagram music-score for playing which represents versatile music elements configuring music, namely, the pitches of sound (the sound-pitches), the lengths of sound (the note-values), the beat of sound, the key (a major key or a minor key), the harmony-tone, the sorts of the music-instruments to use, and the like, a generating/reproducing device of picture-image music which plays the music based on this diagram music-score, and a generating/reproducing method of picture-image music are furnished.

And, in a generating/reproducing device of picture-image music which generates and/or reproduces music from a picture-image, including:

a picture-image inputting part;

a picture-image memorizing part which stores plural picture-images having been inputted from the picture-image inputting part;

a displaying part which displays letters or diagrams or picture-images;

a sound-source memorizing part which stores plural sound-sources;

a sound-source setting part which sets, regarding each color name for which the range of color attribute value has been set, a sound-source;

a mosaic picture-image generating part which divides the picture-image into arbitrary lattice-shape blocks, for which the vertical axis corresponds to the sound-pitch and the horizontal axis corresponds to the beat, determines a representative-color of each of the blocks, paints out the blocks with the representative-colors thereof, and thereby generates a mosaic picture-image;

a block color name recognizing part which recognizes the range of the color name to which the representative-color of each block belongs;

a block selecting part which selects blocks within the above described mosaic picture-image;

a diagram music-score generating part which generates musical-notes from the above described blocks having been selected, and generates a diagram music-score color-separated with the color names which correspond to the sound-sources; and a music generating part which generates music data from the above described diagram music-score, a picture-image is displayed so as to synchronize with the reproduction of the music, and the above described music is generated/reproduced.

By automatically recognizing, from the representative-color of the block of the mosaic picture-image, the color name with the range of the color attribute value having been decided, sound-sources such as music-instruments or the like appropriate thereto are chosen, and a color-separated diagram music-score including versatile music elements is created. In accordance with this diagram music-score, music which corresponds to the picture-image can be played.

Moreover, by the parameters of the color attribute value and the position attribute value, the blocks are selected.

Because causing the visual-sense information of the whole picture-image to be reflected in the auditory-sense information, the picture-image blocks can be selected, music appropriate to the picture-image is generated.

Moreover, in such a manner that the displaying synchronizes with the reproduction of the music, the displaying part is caused to display the picture-image and the diagram music-score.

While a user views the music-score and the picture-image, the music can be reproduced at the same time. Moreover, while a user listen to the music, the picture-image and the playing music-score are displayed at the same time, the picture-image is evaluated, whether the music is appropriate thereto is evaluated, and music-score revision or musical-arrangement can be carried out.

Moreover, a slideshow generating part is included, plural picture-images are switched in turn and, in such a manner that the displaying synchronizes with the reproduction of the music, a slideshow is reproduced.

From consecutive picture-images a slideshow with background music (BGM) can be generated. On top of that, a user is not troubled with choice of the BGM thereof and, moreover, excepting rights which are produced for automatic generation of music, problems of utilization permission of copyright and infringement, which accompany utilizing music of a third person, are not produced.

Moreover, a moving-picture file creating part is included, the picture-images of the slideshow, and the music are integrated, and thereby moving-picture data of a moving-picture file format are created.

Since the moving-picture file which has been created is in conformity with a moving-picture file format of an industry-standard, special player software is not necessitated and, making use of general software such as a browser, a multimedia player or the like, a moving-picture for which the music having been generated synchronizes with the picture-images can be viewed.

Moreover, plural blocks which are consecutive in the direction of the horizontal axis are caused to correspond to one musical-note, and thereby the music is reproduced.

In a case where the above described blocks which have been selected have merged in the direction of the horizontal axis, since a diagram music-score for which the length of the merger thereof is reflected in the length of the musical-note (the note-value) can be generated, smooth music can be created especially with stringed music-instruments or the like.

Moreover, from musical-notes which correspond to blocks, harmony-tone is produced.

A diagram music-score for which beautiful harmony-tone can be played is created, and thereby music of organization such as an orchestra, which has both of harmonicity and expression-power by plural music-instruments, can be played.

Moreover, the displaying part is caused to display a figure for performing setting of the range of the color attribute value, and/or the parameters of the block selection, and/or the sound-sources.

By the present invention, a user can manipulate the setting of the range of the color attribute value, and/or the parameters of the block selection, and/or the sound-sources, which has been displayed in the figure, and thereby easily revise/alter the music which is generated.

Moreover, from the sending-side a picture-image with music data, or a picture-image with a diagram music-score is sent, and on the receiving-side the music is reproduced so as to synchronize with the picture-image.

In a terminal at a remote place, a picture-image with music data, or a picture-image with a diagram music-score is sent/received, and thereby the picture-image and the music which have been created at another place can be reproduced. Moreover, on the receiving-side the music which has been generated can be easily revised/altered.

Moreover, a generating server function of picture-image music is realized, for which a picture-image having been sent from the terminal-side is received, the music data which correspond thereto, or the above described picture-image with music data, or the above described picture-image with a diagram music-score, or the moving-picture data are generated, and is sent to the terminal which has sent the picture-image, or a terminal or a server which has been separately specified.

From a terminal which has been connected to the Internet and the like a picture-image is forwarded to a server, and music, or music with a picture-image, or a moving-picture can be created on the server-side from the picture-image and thereby, in such a manner that multiple people can enjoy those, be stored/distributed.

Moreover, a picture-image music reproducing method or a program, which reproduces picture-image music using:
a picture-image inputting part;
a picture-image memorizing part which stores plural picture-images having been inputted from the picture-image inputting part;
a displaying part which displays letters or diagrams or picture-images; and
a sound-source memorizing part which stores plural sound-sources,
wherein regarding each color name for which the range of color attribute value has been set, a sound-source is set,
the picture-image is divided into arbitrary lattice-shape blocks, for which the vertical axis corresponds to the sound-pitch and the horizontal axis corresponds to the beat, a representative-color of each of the blocks is determined, the blocks are painted out with the representative-colors thereof, and thereby a mosaic picture-image is generated,
the range of the color name to which the representative-color of each block belongs is recognized,
blocks within the above described mosaic picture-image are selected,
musical-notes are generated from the above described blocks having been selected, and a diagram music-score color-separated with the color names which correspond to the sound-sources is generated,
music data are generated from the above described diagram music-score, and
a picture-image is displayed so as to synchronize with the reproduction of the music, and the above described music is reproduced.

By automatically recognizing, from the representative-color of the block of the mosaic picture-image, the color name with the range of the color attribute value having been decided, sound-sources such as music-instruments or the like appropriate thereto are chosen, and a color-separated diagram music-score including versatile music elements is created. In accordance with this diagram music-score, music which corresponds to the picture-image can be played.

By the above described picture-image music generating device or the method or the program, from the color attribute value or the picture-image position attribute value of the block for which one or plural picture-images are divided, a diagram music-score which represents versatile music elements is automatically generated, and thereby music by plural music-instruments can be played. Moreover, a picture-image or a diagram music-score or music data are sent/received, and thereby a slideshow or a moving-picture can be reproduced even at a remote place. Moreover, a user can revise the music data with simple manipulation in the screen, and can easily carry out creation, revision or the like of the slideshow and the moving-picture.

Additionally, a program of invention related to the present invention is a program for causing a computer to execute the operations of all parts or a part of the steps (or processes, operations, actions and the like) of the above described music information generating method of the present invention, and is a program which operates in cooperation with the computer.

Moreover, a recording medium of the present invention is a recording medium which has recorded the program for causing the computer to execute all parts or a part of the operations of all parts or a part of the steps (or processes, operations, actions and the like) of the above described music information generating method of the present invention, and is a computer-readable recording medium where the above described program which has been read is utilized in cooperation with the above described computer.

Additionally, the above described "a part of the steps (or processes, operations, actions and the like)" means one or several steps of those plural steps.

Moreover, the above described "the operations of the steps (or processes, operations, actions and the like)" means all parts or a part of the operations of the above described steps.

Moreover, a utilization form of the program of invention related to the present invention may be an aspect of being transmitted within a transmission medium such as the Internet and the like, or a transmission medium such as light, an electric wave, a sound wave and the like, being read by the computer, and operating in cooperation with the computer.

Moreover, as the recording medium, a ROM and the like are included.

Moreover, the above described computer of the present invention is not limited to pure hardware such as the CPU and the like, and may include firmware, an OS and further a peripheral apparatus.

Additionally, as described above, the configuration of the present invention may be realized in software, or may be realized in hardware.

A music information generating device, a music information generating method, and a recording medium in the present invention are such that music being more appropriate to a picture-image can be automatically generated, and are useful for the purpose of utilizing for a music information generating device, a music information generating method, and a recording medium, related to a generating/reproducing device of picture-image music which generates/reproduces music from a picture-image, a generating/reproducing method of picture-image music, and the like.

What is claimed is:

1. A music information generating device, comprising:
   a picture-image inputting part which inputs a picture-image;
   a sound-source name memorizing part which stores plural sound-source names;
   a block representative-color determining part which determines, where with a vertical axis corresponding to a pitch of sound and a horizontal axis corresponding to a progression time of sound, the picture-image is divided into blocks having been arranged in lattice shape, a representative-color of each of the blocks;
   a block color name recognizing part which selects and determines, from among plural color names which are made to correspond to plural ranges of color attribute value having been set beforehand, a color name corresponding to the representative-color of the block as a block color name of the block, by recognizing to which range of the color attribute value the representative-color of the block belongs, where the plural color names have been made or are going to be made to correspond to the plural sound-source names having been stored; and
   a diagram music-score generating unit which selects, based on a criterion having been set beforehand, a designated block from among the blocks having been arranged in lattice shape, and thereby generates a diagram music-score,
   wherein the diagram music-score generating unit utilizes a sound-source name of the block, a pitch of sound of the block, and a progression time of sound of the block, and thereby generates the diagram music-score.

2. The music information generating device according to claim 1, comprising:
   a picture-image memorizing part which stores the picture-image having been inputted from the picture-image inputting part;
   a displaying part which displays at least the picture-image;
   a sound-source name setting part which makes the plural color names, and the plural sound-source names correspond to each other; and
   a music data generating part which generates music data from the diagram music-score having been generated, wherein
   the displaying part displays at least one of a mosaic picture-image where the blocks having been arranged in lattice shape have been painted out with the representative-colors, and a mosaic picture-image where the designated block having been selected has been painted out with a color of the block color name.

3. The music information generating device according to claim 2, comprising an audio-sound outputting part which reproduces the music data having been generated, wherein
   the displaying part displays, in such a manner that reproduction of the music data having been generated synchronizes with displaying, at least one of the picture-image having been stored and the diagram music-score having been generated.

4. The music information generating device according to claim 2, comprising:
   an audio-sound outputting part which reproduces the music data having been generated; and
   a slideshow generating part which performs, in such a manner that reproduction of the music data having been generated from plural picture-images having been inputted to the picture-image inputting part synchronizes with displaying, a slideshow of the plural picture-images.

5. The music information generating device according to claim 2, comprising a moving-picture file creating part which integrates the music data having been generated from plural picture-images having been inputted to the picture-image inputting part, and data of the plural picture-images, and thereby creates a moving-picture file.

6. The music information generating device according to claim 5, wherein the plural picture-images having been inputted to the picture-image inputting part are plural picture-images having been sent from a designated terminal and received, and
   the moving-picture file having been created is sent to at least one of the designated terminal, a terminal different to the designated terminal, and a designated server.

7. The music information generating device according to claim 2, wherein the music data generating part causes plural blocks, which have the same block color name consecutively in a direction of the horizontal axis, to correspond to one musical-note, and thereby generates the music data.

8. The music information generating device according to claim 2, wherein the displaying part displays a figure which is utilized for performing setting of the range of the color attribute value, setting of a parameter for selection of the designated block, and setting of the sound-source name.

9. The music information generating device according to claim 2, wherein the music data having been generated, or the diagram music-score having been generated is sent to at least one of a designated terminal, and a designated server.

10. The music information generating device according to claim 9, wherein the picture-image having been inputted to the picture-image inputting part is a picture-image having been sent from the designated terminal and received.

11. The music information generating device according to claim 9, wherein the designated terminal is another terminal which is not a terminal having sent the picture-image having been inputted to the picture-image inputting part, and
the music data having been generated, or the diagram music-score having been generated is sent to at least one of the another terminal, and the designated server, along with the picture-image having been inputted to the picture-image inputting part.

12. The music information generating device according to claim 1, wherein the diagram music-score generating unit utilizes an eliminating parameter relating to at least one of color attribute of the block having been arranged in the lattice shape, and position attribute of the block in the picture-image, and thereby selects the designated block.

13. The music information generating device according to claim 1, wherein the diagram music-score generating unit utilizes harmony-tone correction for producing harmony-tone, and thereby generates the diagram music-score.

14. A music information generating method, comprising:
a picture-image inputting step which inputs a picture-image;
a sound-source name memorizing step which stores plural sound-source names;
a block representative-color determining step which determines, where with a vertical axis corresponding to a pitch of sound and a horizontal axis corresponding to a progression time of sound, the picture-image is divided into blocks having been arranged in lattice shape, a representative-color of each of the blocks;
a block color name recognizing step which selects and determines, from among plural color names which are made to correspond to plural ranges of color attribute value having been set beforehand, a color name corresponding to the representative-color of the block as a block color name of the block, by recognizing to which range of the color attribute value the representative-color of the block belongs, where the plural color names have been made or are going to be made to correspond to the plural sound-source names having been stored; and
a diagram music-score generating step which selects, based on a criterion having been set beforehand, a designated block from among the blocks having been arranged in lattice shape, and thereby generates a diagram music-score,
wherein the diagram music-score generating step utilizes a sound-source name of the block, a pitch of sound of the block, and a progression time of sound of the block, and thereby generates the diagram music-score.

15. A non-transitory computer-readable recording medium, recording a program for causing a computer to function as the block representative-color determining step which determines, where with a vertical axis corresponding to a pitch of sound and a horizontal axis corresponding to a progression time of sound, the picture-image is divided into blocks having been arranged in lattice shape, a representative-color of each of the blocks, the block color name recognizing step which selects and determines, from among plural color names which are made to correspond to plural ranges of color attribute value having been set beforehand, a color name corresponding to the representative-color of the block as a block color name of the block, by recognizing to which range of the color attribute value the representative-color of the block belongs, where the plural color names have been made or are going to be made to correspond to the plural sound-source names having been stored, and the diagram music-score generating step which selects, based on a criterion having been set beforehand, a designated block from among the blocks having been arranged in lattice shape, and thereby generates a diagram music-score of the music information generating method according to claim 14.

* * * * *